United States Patent
Yang et al.

(10) Patent No.: US 12,217,241 B2
(45) Date of Patent: Feb. 4, 2025

(54) SYSTEMS AND METHODS FOR DIGITAL GIFT CARD MARKETPLACE AND REDEMPTIONS

(71) Applicant: LITT GLOBAL PTY. LTD., North Fremantle (AU)

(72) Inventors: Steven Yang, North Fremantle (AU); Fabio Peretti, North Fremantle (AU); Peter Salom, North Fremantle (AU); Brent Thompson, North Fremantle (AU)

(73) Assignee: LITT GLOBAL PTY. LTD., North Fremantle (AU)

(*) Notice: Subject to any disclaimer, the term of this patent is extended or adjusted under 35 U.S.C. 154(b) by 122 days.

(21) Appl. No.: 18/132,928

(22) Filed: Apr. 10, 2023

(65) Prior Publication Data
US 2023/0334466 A1    Oct. 19, 2023

Related U.S. Application Data

(60) Provisional application No. 63/330,702, filed on Apr. 13, 2022.

(51) Int. Cl.
*G06Q 20/34* (2012.01)
*G06Q 20/32* (2012.01)
(Continued)

(52) U.S. Cl.
CPC ....... *G06Q 20/342* (2013.01); *G06Q 20/3267* (2020.05); *G06Q 20/36* (2013.01); *G06Q 20/4014* (2013.01); *G06Q 30/0226* (2013.01)

(58) Field of Classification Search
CPC .. G06Q 20/342; G06Q 20/3267; G06Q 20/36; G06Q 20/4014; G06Q 30/0226;
(Continued)

(56) References Cited

U.S. PATENT DOCUMENTS 8,046,256 B2 * 10/2011 Chien ................ G06Q 30/0215
                                                      705/14.33
9,805,370 B1 * 10/2017 Quigley .................. H04W 4/80
(Continued)

FOREIGN PATENT DOCUMENTS

WO    2012166790    12/2012
WO    2023199114    10/2023

OTHER PUBLICATIONS

Privacy preserving loyalty programs Alberto Blanco-Justicia and Josep Domingo-Ferrer (Year: 2014).*

(Continued)

*Primary Examiner* — Alexandru Cirnu
(74) *Attorney, Agent, or Firm* — Snell & Wilmer L.L.P.

(57) ABSTRACT

A system for a mobile gift card marketplaces is disclosed. The system may initiate a contactless payment at a merchant via a mobile app. The system may receive an authorization message based on the contactless payment. The system may execute an authorization process in response to receiving the authorization message to determine an authorized transaction. The system may validate the authorized transaction to determine whether the authorized transaction is associated with a customer. The system may execute a merchant validation process to determine if the authorized transaction is associated with a merchant. The system may determine an available gift card account balance of the customer associated with the merchant in response to determining the authorized transaction is associated with both the customer and the merchant. The system may execute a gift card redemption process to redeem the available gift card account balance of the customer associated with the merchant.

13 Claims, 19 Drawing Sheets

(51) Int. Cl.
  *G06Q 20/36*   (2012.01)
  *G06Q 20/40*   (2012.01)
  *G06Q 30/0226* (2023.01)

(58) Field of Classification Search
  CPC ............ G06Q 20/327; G06Q 20/3278; G06Q 20/387; G06Q 20/401; G06Q 20/403; G06Q 20/405; G06Q 30/0233; G06Q 20/065; G06Q 20/20; G06Q 20/227; G06Q 20/322
  See application file for complete search history.

(56) References Cited

U.S. PATENT DOCUMENTS

| | | | |
|---|---|---|---|
| 10,692,059 B1 | 6/2020 | Thome et al. | |
| 2007/0260509 A1* | 11/2007 | Hines | G06Q 30/0235 |
| | | | 705/14.27 |
| 2010/0082485 A1* | 4/2010 | Lin | G06Q 20/40 |
| | | | 235/383 |
| 2013/0110719 A1* | 5/2013 | Carter | G06Q 20/351 |
| | | | 705/44 |
| 2014/0279099 A1* | 9/2014 | Vos | G06Q 20/3572 |
| | | | 705/16 |
| 2014/0034414 A1 | 11/2014 | Campos | |
| 2015/0235256 A1* | 8/2015 | Barsoum | G06Q 20/02 |
| | | | 705/14.33 |
| 2016/0350789 A1* | 12/2016 | Joglekar | G06Q 30/0227 |
| 2018/0315027 A1* | 11/2018 | Kumar | G06Q 20/3278 |
| 2019/0122222 A1* | 4/2019 | Uechi | G06Q 20/42 |
| 2021/0027210 A1 | 9/2021 | Kalgi | |
| 2023/0222507 A1* | 7/2023 | Patel | G06Q 20/18 |
| | | | 705/39 |

OTHER PUBLICATIONS

International Search Report and Written Opinion dated Aug. 30, 2023 in PCT International Patent Application No. PCT/IB2023/000205.

* cited by examiner

FIG. 7B

750 carrier 🛜  3:22 pm  • ⊕ ⬆ 🔋 10% ▢

🔥 APP —758
Promo Code - APP —760  _752_  A$10.00 —756
29 November 2021 —754

762
🏴 the_left_bank
Loyalty Cash Back - The Left Bank
4 November 2021                                    A$2.03

🏴 the_left_bank
Card Payment - The Left Bank
4 November 2021                                   -A$40.50

🔥 APP
Reward Point Redemption - APP
6 October 2021                                     A$5.91 nbcbeerland
Loyalty Cash Back - Northbridge Brewing Co
4 September 2021                                   A$0.20 nbcbeerland
LITT Card Payment - Northbridge Brewing Co
4 September 2021                                  -A$4.00 nbcbeerland
LITT Card Payment - Northbridge Brewing Co
4 September 2021                                  -A$65.30 nbcbeerland
Loyalty Cash Back - Northbridge Brewing Co                               A$3.27

Map  Newsfeed  Search  Wallet  Chat  Profile

FIG. 7B

SYSTEMS AND METHODS FOR DIGITAL GIFT CARD MARKETPLACE AND REDEMPTIONS

CROSS REFERENCE TO RELATED APPLICATIONS

This application claims priority to, and the benefit of, U.S. Provisional Patent Application No. 63/330,702 filed on Apr. 13, 2022 entitled "SYSTEMS AND METHODS FOR DIGITAL GIFT CARD MARKETPLACE AND REDEMPTIONS", the disclosure of which is hereby incorporated by reference in their entirety.

FIELD

The present disclosure generally relates to mobile devices, and in particular to systems and methods for mobile and automated exchange and management of gift cards.

BACKGROUND

Traditionally, systems for the purchase, delivery, and use of gift cards tend to provide little to no opportunity for flexibility and creativity in the nature of the gift cards. Further, traditional systems tend to provide limited or no opportunity for interaction, information sharing, messaging, or marketing between and/or among merchants, customers, and other system users. Furthermore, traditional systems tend to require the inventorying and management of multiple independent and/or unrelated gift cards. Therefore, a need exists for systems and methods that can provide a more interactive, customizable, flexible, and convenient gift card experience for purchasers, recipients, suppliers, and merchants.

SUMMARY

In various embodiments, systems, methods, and articles of manufacture (collectively, the "system") for mobile gift card marketplaces are disclosed. In various embodiments, the system may initiate a contactless payment at a merchant via a mobile app. The system may receive an authorization message based on the contactless payment. The system may execute an authorization process in response to receiving the authorization message to determine an authorized transaction. The system may validate the authorized transaction to determine whether the authorized transaction is associated with a customer. The system may execute a merchant validation process to determine if the authorized transaction is associated with a merchant. The system may determine an available gift card account balance of the customer associated with the merchant in response to determining the authorized transaction is associated with both the customer and the merchant. The system may execute a gift card redemption process to redeem the available gift card account balance of the customer associated with the merchant. The system may start a digital wallet payment process to pay any remaining balance of a transaction amount unable to be paid from redeeming the available gift card account balance of the customer associated with the merchant. The system may execute a loyalty cashback process to apply a credit, based on the transaction amount, to a digital wallet balance associated with the customer In various embodiments, the authorization message comprises at least five of a transaction number, a timestamp, a Pseudo-Primary Account Number (PPAN), a currency type, an amount, a transaction code, a transaction type, a description, an acquirer ID, a merchant ID, a merchant name, a terminal ID, and a reference number. In various embodiments, the system may log the authorization message into internal storage. The system may check whether the currency type is an approved currency type. The system may reject a transaction in response to determining the currency type is not the approved currency type.

In various embodiments, the system may perform a key field search based on the PPAN from the authorization message of a database comprising customer data associated with a plurality of PPAN. The system may return a customer record associated with the PPAN. The system may determine an active customer based on the customer record associated with the PPAN. The system may reject the transaction in response to not determining an active customer or not returning a customer record.

In various embodiments, the system may perform a key field search based on the merchant ID from the authorization message of a database comprising merchant data associated with a plurality of merchant IDs and a plurality of merchant names. The system may perform a key field search based on the merchant name from the authorization message of the database comprising merchant data associated with a plurality of merchant IDs and a plurality of merchant names. The system may return a record associated with at least one of the merchant ID or the merchant name from the authorization message. The system may proceed to a balance check and redemption process in response to returning the record associated with at least one of the merchant ID or the merchant name from the authorization message.

In various embodiments, the system may perform a key field key search on merchant ID and product ID from the authorization message of a database comprising merchant data associated with a plurality of merchant IDs and a plurality of merchant names; and of a database comprising product data associated with a plurality of product IDs and a plurality of product names. The system may return a record associated with the product ID and at least one of the merchant ID or the merchant name from the authorization message. The system may proceed to a balance check and redemption process in response to returning the record associated with the product ID and the at least one of the merchant ID or the merchant name from the authorization message.

In various embodiments, The system may perform a key field key search on product ID from the authorization message of a database comprising product data associated with a plurality of product IDs and a plurality of product names. The system may return a record associated with the product ID from the authorization message. The system may proceed to a balance check and redemption process in response to returning the record associated with at least one of the product ID from the authorization message.

In various embodiments, the system may recall based on at least one of the merchant ID or the merchant name a plurality of gift cards associated with the customer record from a database of gift cards. The system may order the plurality of gift cards associated with the customer record in reverse chronological order. The system may redeem the plurality of gift cards in said order against the amount of the authorization message. The system may determine a remaining amount to charge after redeeming the plurality of gift cards. The system may debit the digital wallet balance associated with the customer by the remaining amount. The system may transmit an approved authorization message.

The foregoing features and elements may be combined in various combinations without exclusivity, unless expressly indicated herein otherwise. These features and elements as well as the operation of the disclosed embodiments will become more apparent in light of the following description and accompanying drawings. The contents of this section are intended as a simplified introduction to the disclosure, and are not intended to limit the scope of any claim.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

FIG. 7B illustrates a transaction history page of the system, in accordance with various embodiments;

DETAILED DESCRIPTION

Various shortcomings of mobile device applications can be addressed by utilizing mobile device applications and/or related cloud-based systems configured in accordance with principles of the present disclosure. For example, the present system improves upon existing technology by enabling digital management of physical gift cards, hybrid payment transactions comprising gift card and cash balances, and full spend of gift card balances.

In various exemplary embodiments, the system may provide a greater level of sophistication and/or control for mobile gift card marketplaces. For example, balances may be gathered across a plurality of dissimilar gift cards and may be intuitively archived for ease of use. While prior art systems typically include the technical problem of limited availability, incomplete spend, lost gift card balances and the like, the current system provides a technical solution by tending to enable a single payment flow irrespective of gift card balance or cash balance. In this regard, the system may enable accelerated payments via hybrid gift card and digital wallet systems. As such, the system may eliminate or reduce information gaps, reduce re-entry of data, and reduce record duplication, and reduce development time. The system may also reduce the cost of development or system processing time for data entry, reduce network utilization, and/or reduce data storage overhead. The system may increase data reliability and/or accuracy by enabling comparison of data between environments at an increased frequency. The system may also reduce redundant or duplicate comparison tasks, thereby reducing a demand for system resources. The system may simplify data acquisition and enhance the user experience by decreasing the number of user interactions (e.g., for customer payments, gift card purchases, and gift card delivery). Moreover, benefits of the present disclosure may apply to any suitable electronic payment platform.

Processes disclosed herein improve the functioning of the computer. For example, the systems and processes disclosed herein may tend to reduce network activity by consolidating multiple gift card based transactions as a single transaction for network processing. In this regard, transaction speeds may be improved and network processing overhead (e.g., bandwidth, processing, etc.) may be reduced tending thereby to reduce power consumption of computing devices such as, for example, mobile devices.

Figure 1:
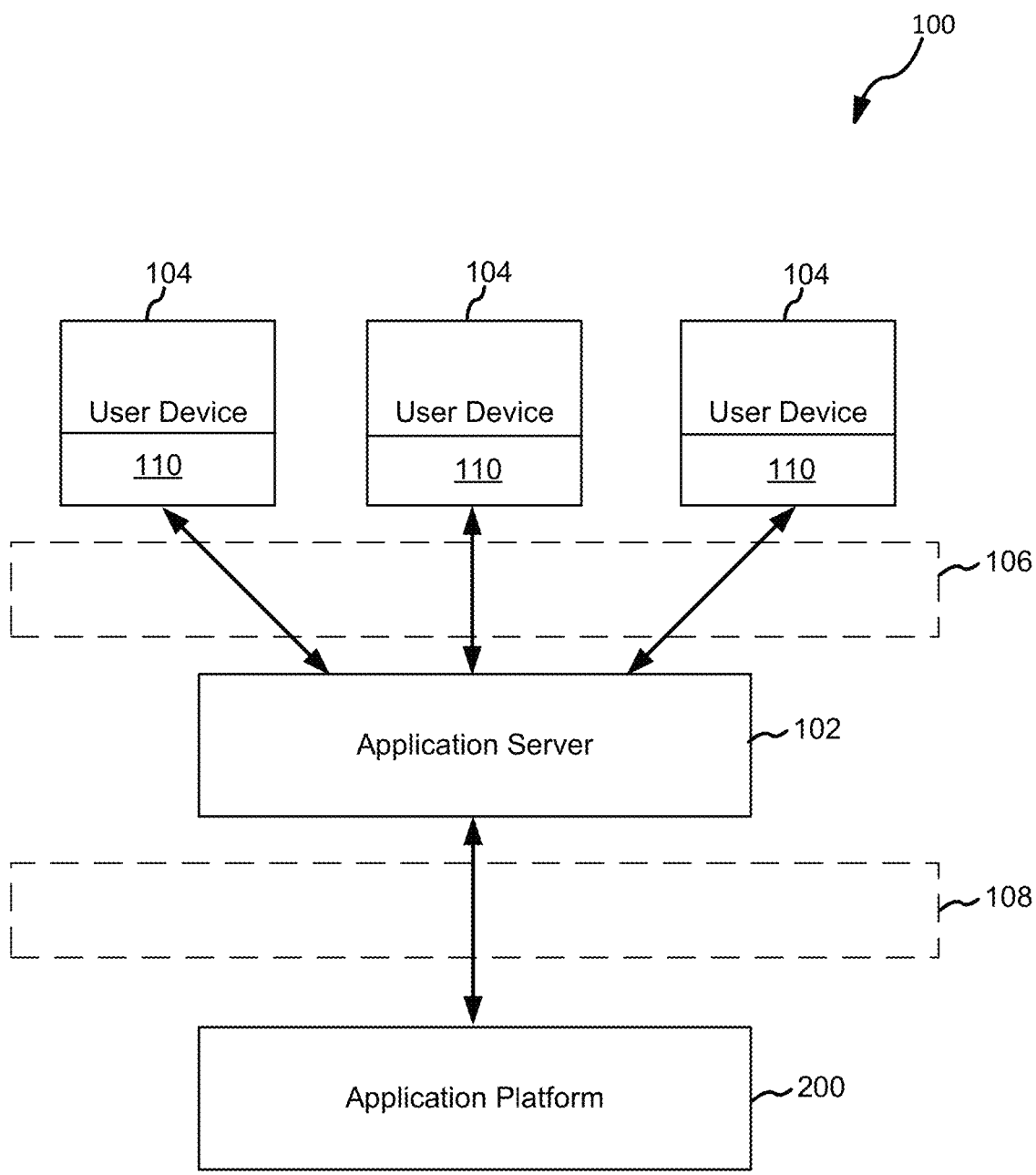
FIG. 1 is a block diagram illustrating various system components of a mobile gift card marketplace system, in accordance with various embodiments.

In various embodiments, and with reference now to FIG. 1, a system 100 may comprise an application server 102, a user device 104, and an application platform 200. Any of these components may be outsourced and/or be in communication with the data comparator application server 102 and/or platform 200 via a network such as, for example a first network 106 and a second network 108.

System 100 may be computer based, and may comprise a processor, a tangible non-transitory computer-readable memory, and/or a network interface, along with other suitable system software and hardware components. Instructions stored on the tangible non-transitory memory may allow system 100 to perform various functions, as described herein. In various embodiments, the application server 102 and/or platform 202 may be configured as a central network element or hub to access various systems, engines, and components of system 100. The application server 102 may comprise a network (e.g., network 106), a computer-based system, and/or software components configured to provide an access point to various systems, engines, and components of system 100. The application server 102 may be in operative and/or electronic communication with user devices 104 via the first network 106 and the platform 200 via the second network 108. In this regard, the application server 102 may allow communication from the user devices 104 to systems, engines, and components of system 100 (such as, for example, API modules 202). In various embodiments, the application server 102 may receive commands and/or metadata from the user devices 104 and may pass replies to the user devices 104.

In various embodiments, application server 102 may include one or more computing devices described above, rack mounted servers, and/or virtual machines providing load balancing, application services, web services, data query services, data transfer services, reverse proxy services, or otherwise facilitating the delivery and receipt of data across networks (106, 108).

In various embodiments, a user device 104 may comprise software and/or hardware in communication with the system 100 via a network (e.g. network 106) comprising hardware and/or software configured to allow a user, and/or the like, access to the application server 102. The user device may comprise any suitable device that is configured to allow a user to communicate with a network and the system 100. The user device may include, for example, a personal computer, personal digital assistant, cellular phone, tablet computer, mobile device, kiosk, and/or the like and may allow a user to transmit comparison requests to the system 100. In various embodiments, the user device 104 described herein may run a web application or native application (e.g., mobile application or mobile app) which may be configured to communicate with application server 102. A mobile app 110 may be installed on the user device 104 via download, physical media, or an app store, for example. The mobile app 110 may utilize the development code base provided for use with the operating system and capable of performing system calls to manipulate the stored and displayed data on the user device 104 and communicates with application server 102. A web application may be web browser compatible and written specifically to run on a web browser. The web application may thus be a browser-based application that operates in conjunction with application server 102.

In various embodiments, the mobile app 110 running on the user device 104 may be in communication with the application server 102 to support real-time updates. For example, data pertaining to the platform 200 may synchronize across the various user devices 104 used by any number of users interacting with the application server 102 and/or platform 200. In this regard, the application server 102 may serve data from platform 200 to each of the user devices 104 and may serve commands from the user devices 104 to the platform 200. In various embodiments, application server 102 may apply access permissions to restrict the data transmitted between the networks (106, 108) and/or the various components of system 100. Users may be authenticated on the mobile app 110, for example, via a user name, password, dual factor authentication, private cryptographic key, one-time password, security question, biometrics, or other suitable authentication techniques know to those skilled in the art.

Figure 2:
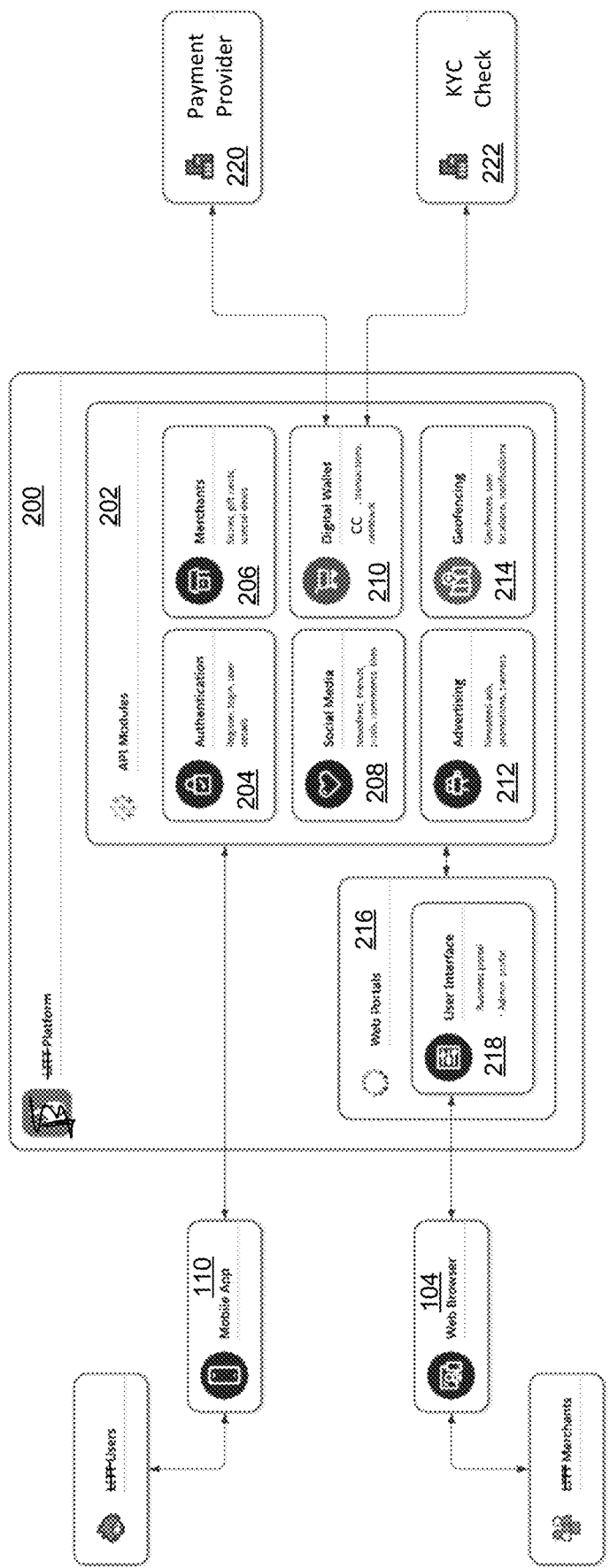
FIG. 2 is a block diagram illustrating a platform of a mobile gift card marketplace system, in accordance with various embodiments.

In various embodiments, and with reference now to FIG. 2, an application platform 200 in a mobile gift card marketplace system (e.g., system 100) is disclosed. Platform 200 may include a web portal 216 configured to communicate with a web browser of the user devices 104. In various embodiments, the web portal 216 comprises a user interface module 218. Platform 200 includes a plurality of API modules 202 which are configured to communicate with mobile app 110 and the web portal 216. In various embodiments, the API modules 202 include authentication 204, merchants 206, social media 208, digital wallet 210, advertising 212, and geofencing 214 modules.

In various embodiments, authentication 204 module may be configured to provide login and identity services such as user registration, management of user details, user authentication, and/or the like. The authentication 204 module may be configured for management of one or more classes of users such as customers and merchants.

In various embodiments, the merchants 206 module may be configured to enable a merchant to create a virtual storefront. The virtual storefront may be interactive via the mobile app 110 and may display one or more classes of gift cards available for purchase by customers accessing the platform 200 via the mobile app 110. Merchants 206 module may enable creation of a gift card and configuration of the gift card for one or more associated parameters such as, for example, price, expiration date, purchase location, gift card name, description, image, etc. The merchants 206 module may enable display of the gift card via the virtual storefront. The merchants 206 module may enable a merchant to define one or more special deals associated with the gift card such as, for example, pay $10 to receive a gift card to the value of $20.

In various embodiments, the social media 208 module may generate newsfeeds. The newsfeeds may be delivered to the mobile app 110 in response to interactions by customers with the virtual storefront. In various embodiments, the social media 208 module may enable users to post images, videos, and/or comments. For example, images, videos, and/or comments may be associated with a virtual storefront and displayed at the virtual storefront. In another example, images, videos, and/or comments may be associated with the user and displayed on a user profile and/or in the newsfeeds. In various embodiments, comments may be associated with comments in a threaded manner for display. The social media 208 module may enable the system to generate a social graph in response to interactions between users. For example, the system may receive a plurality of friends requests and/or a plurality of likes from the users. In various embodiments, the friends requests may be associated on a one-to-one basis with users. In various embodiments, the likes may be associated with comments. In various embodiments, the system may generate the social graph based on the friends requests and the likes. The system may generate the social graph based on, for example, any of sharing of images and videos between users, in-app chats between users, joining of a user to a user group comprising a plurality of other users (e.g., based on a shared interest between the users such as a Hiking Group), joining of a user to an event group comprising a plurality of other users (e.g., based on a shared event such as a sporting event).

In various embodiments, the digital wallet 210 module enables custodial functions for user funds. The digital wallet 210 module may enable processing of gift card transactions. The digital wallet 210 module may enable processing of cash back rewards in response to processing transactions. In various embodiments, the digital wallet 210 module may interface with one or more payment rails (e.g., network infrastructure for digital money transfers) via a digital payment service provider 220 such as, for example, Novatti. In various embodiments, the digital payment service provider 220 may be an issuer. In various embodiments, the digital wallet 210 module may interface with one or more Know Your Customer (KYC) service providers 222 such as, for example, Frankieone.

In various embodiments, the advertising 212 module may enable merchants to create one or more types of advertisements. The system may generate the advertisements for display via the mobile app 110. The advertising 212 module may enable configuration of one or more parameters of the advertisements in the generation process. In various embodiments, the advertisements may be configurable for display based on user data such as customer demographics. For example, the advertising 212 module may push an advertisement to the mobile app of each customer between 21 years old and 35 years old who is male. In various embodiments, the advertising 212 module may enable creation of banner type advertisements for display in the virtual storefront or which may be displayed via push to the mobile app 110. In another example, the advertising 212 module may enable a merchant to create a promotion type advertisement. For example, the promotion type advertisement may comprise a discount for gift card purchases with terms defined based on time, date, purchase volume, geospatial location, and/or the like.

In various embodiments, the geofencing 214 module may enable additional system features and module functionality in connection with mobile device metadata and/or telemetry from the mobile app 110. For example, geofencing 214 module may enable advertising 212 module to push an advertisement to the mobile app 110 in response to determining the proximity of a user device 104 running the mobile app 110 to a geospatial location. In this regard, the system may enable a merchant to deliver advertising via the mobile app 110 in response to a customer entering a geospatial boundary defined by the geofencing 214 module. In another example, a promotion may be associated with the geospatial location. The system may deliver the promotion to via the mobile app 110 in response to a customer entering a geospatial boundary defined by the geofencing 214 module. In response to a customer interaction with the promotion via the mobile app 110, the system may start additional process or execute instructions associated with the promotion.

In various embodiments, the user interface module 218 may be configured to provide displays and services such as a business portal and an admin portal accessible to merchants. In various embodiments, the user interface module 218 may be configured to compile and/or display da from the advertising module as advertising metrics such as, for example, advertising view counts, page interest, number of clicks, customer demographics, and/or the like. The system may compile the advertising metrics as one or more reports deliverable through the user interface module 218.

Figure 3:
FIG. 3 illustrates a gift card display page of the system, in accordance with various embodiments.

In various embodiments, and with reference to FIG. 3, a gift card display page 300 of system 100 is illustrated as displayed on a user device 104 via the mobile app 110. Page 300 includes a plurality of gift card frames 302 representing one or more gift cards which have been purchased by a customer or gifted to the customer (e.g., transferred to the customer from another customer or a merchant). The gift card frame 302 may include an image 304 associated with a merchant. The gift card frame 302 may include a merchant name 306 such as, for example, "Mr. Mod's Craft Beer" or "The Palace Café". The gift card frame 302 may include a merchant type 308 such as, for example, "Food & Drinks" or "Bottle Shop". The gift card frame 302 may include a current balance 310 which may be denominated in one or more currencies such as, for example, "A$10.00" or "A$5.00." In various embodiments, the gift card frames 302 includes a received item type identifier 316. The received item type identifier 316 may display data related to a received item such as "Gift Card," "AR Deal," and/or "Coupon.". In various embodiments, page 300 includes a search field 312. The system may receive a search input via the search field 312 and display one or more gift card frames 302 associated with the search input. In various embodiments, page 300 includes a close button 314. In response to a user interaction with the close button 314, the system may cease displaying page 300. In various embodiments, each of the gift card frames 302 may be interactable as buttons and, in response to a user interaction with the a gift card frame 302, the system may display a gift card details page 400.

Figure 4:
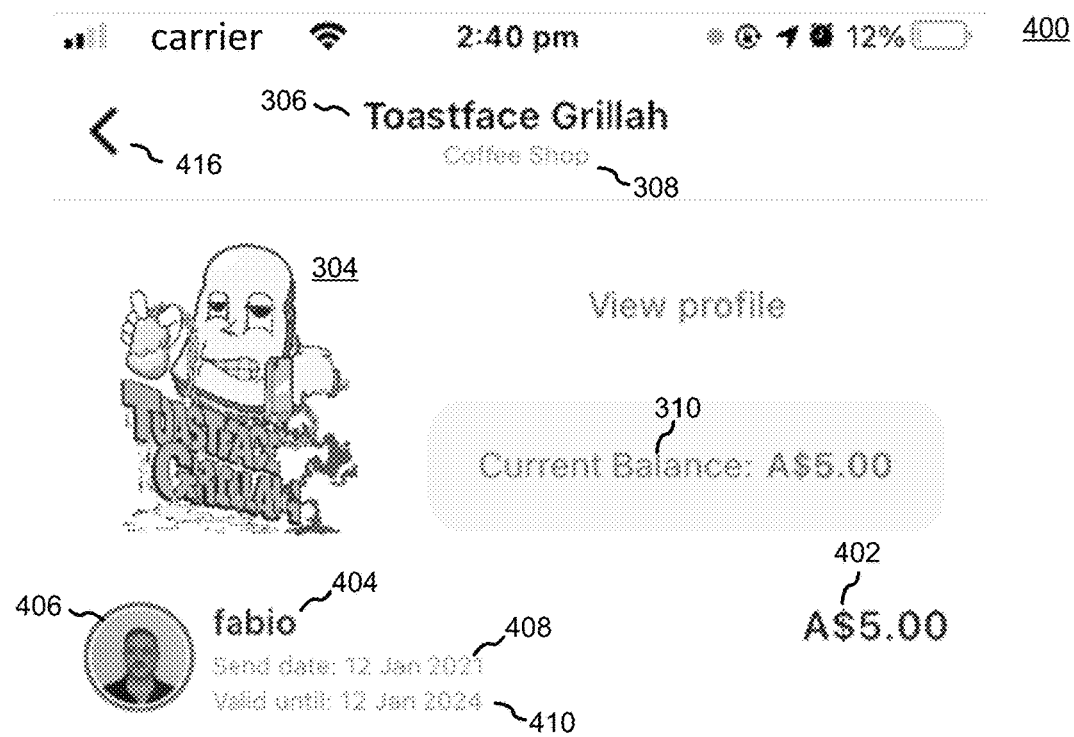
FIG. 4 illustrates a gift card details page of the system, in accordance with various embodiments.

In various embodiments, and with reference to FIG. 4, a gift card details page 400 of system 100 is illustrated as displayed on a user device 104 via the mobile app 110. Page 400 includes some of the displays of page 300 such as the merchant name 306, the merchant type 308, the image 304, and the current balance 310 associated with the selected gift card. Page 400 may include an initial balance 402 associated with the selected gift card. Page 400 may include social elements such as, a gifting user 404 such as, for example, "fabio." In this regard, gift cards may be sent from a first customer (i.e., the gifting user) to a second customer (the receiving user) of the system. In various embodiments, page 400 may include a first profile picture 406 of the gifting user 404. Page 400 may include a sent date 408 and an expiry date 410 of the selected gift card. Page 400 may include a description field 412 comprising information about the merchant configurable terms and conditions associated with selected gift card such as, for example, "redeemable at Wolf Lane only." Page 400 may include an address field 414 which may display the address of the merchant associated with the gift card. In various embodiments, page 400 includes a redeem card button 416. Page 400 may include a back button 416. In response to a user interaction with the back button 416 the system may close page 400 and display page 300.

Figure 5A:
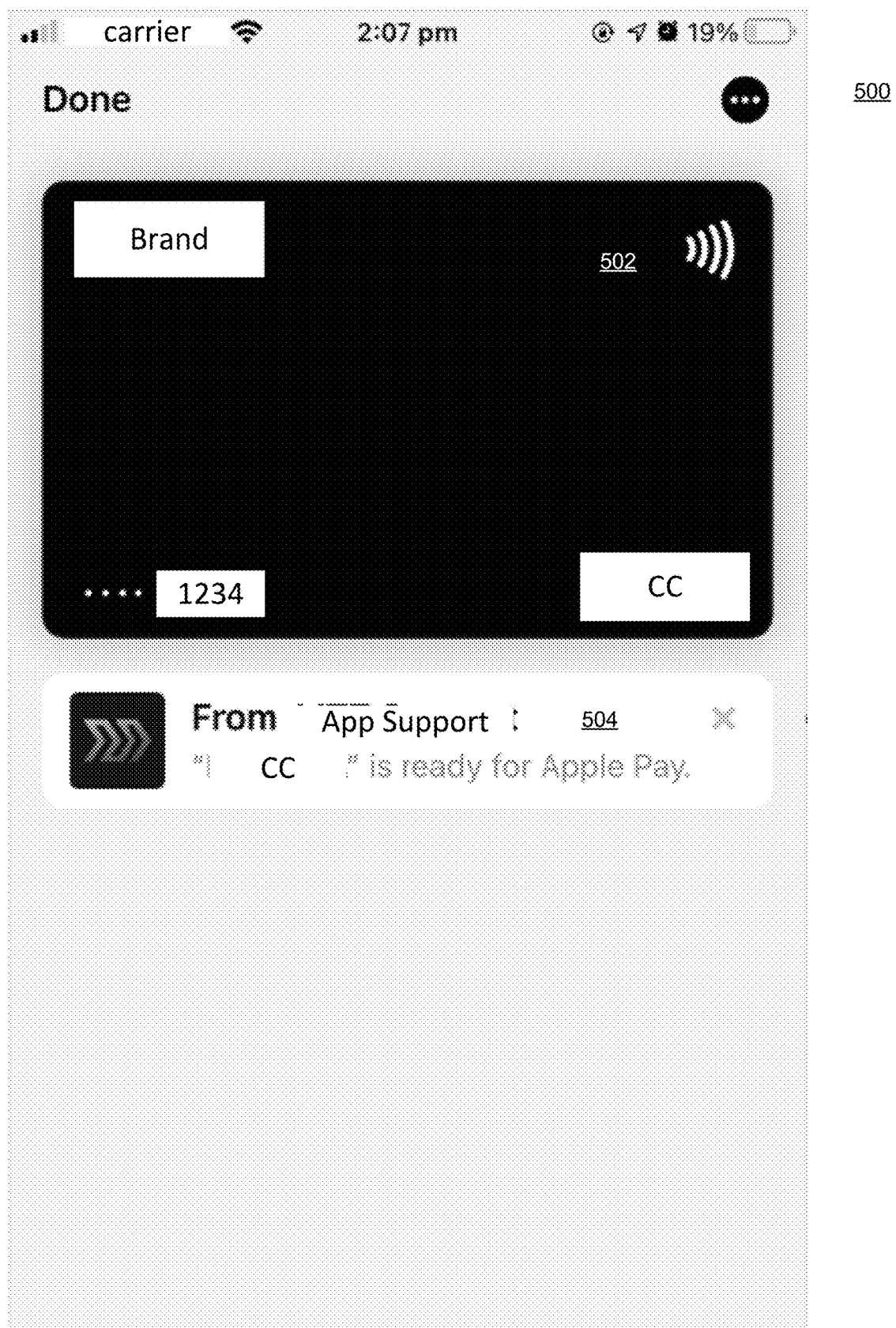
FIG. 5A illustrates a first payment process page of the system, in accordance with various embodiments.
Figure 5B:
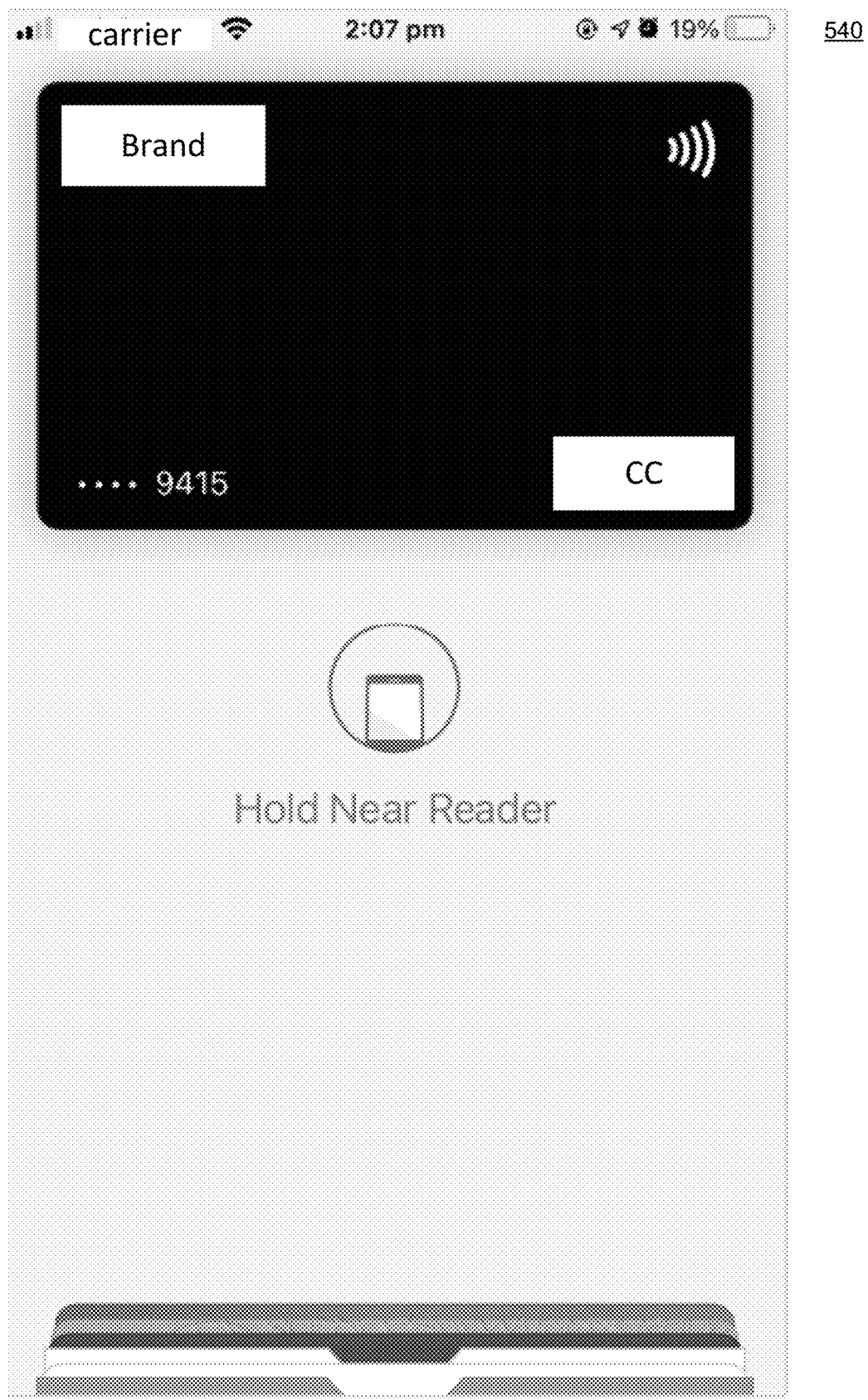
FIG. 5B illustrates a payment communication display page of the system, in accordance with various embodiments.
Figure 5C:
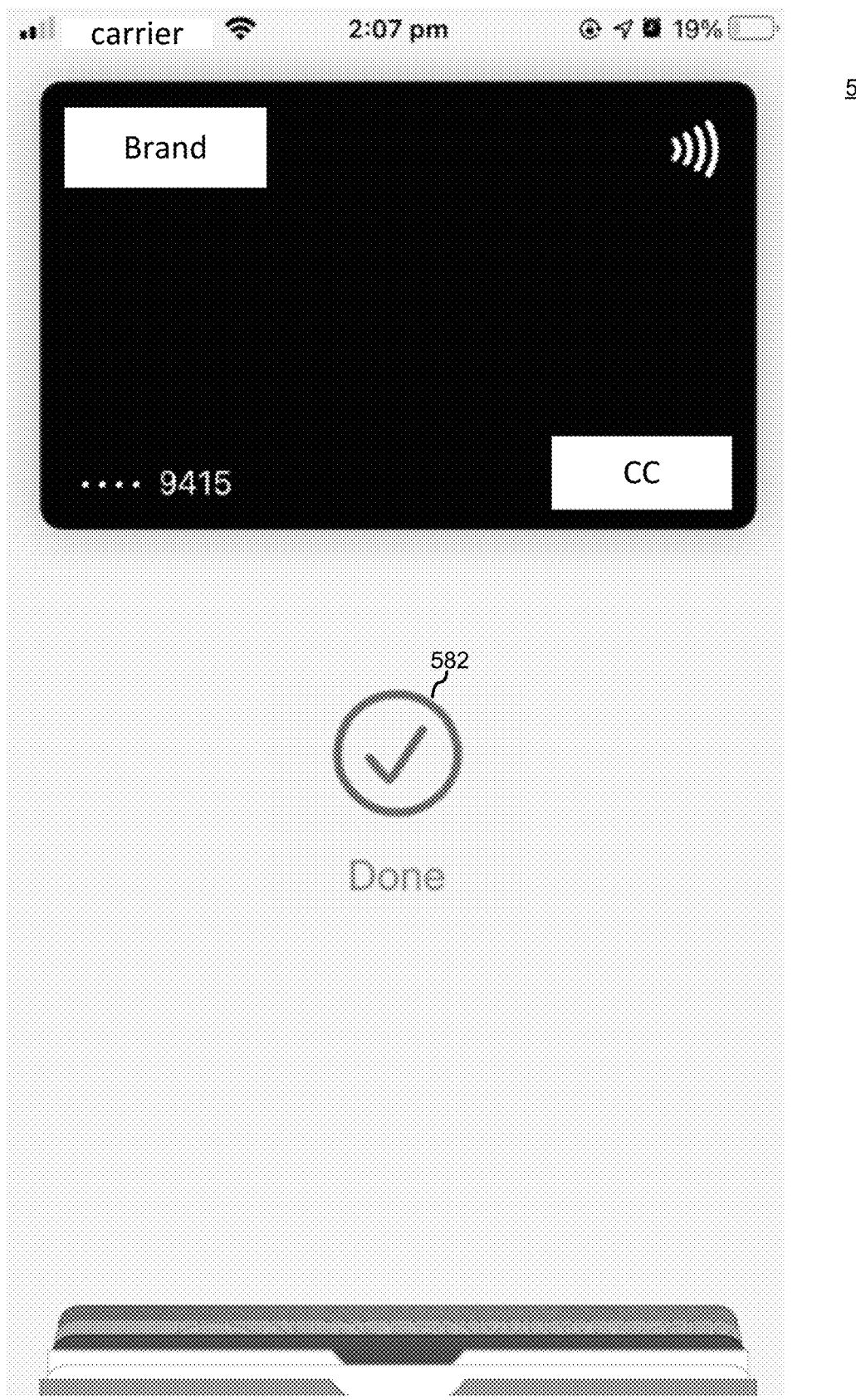
FIG. 5C illustrates a second payment process page of the system, in accordance with various embodiments.

In various embodiments, in response to a user interaction with the redeem card button 416, the system may start a payment process 900 (illustrated in FIG. 9) and display a first payment process page 500, as illustrated in FIG. 5A. Page 500 may include a virtual payment card display 502 illustrating details of a payment card associated with the user. Page 500 may include a status message 504 configured to display information about system progress related to the payment process 900. In various embodiments, and as illustrated in FIG. 5B, the system may display a payment communication display 540 prompting the user to hold the mobile device 104 proximate a payment terminal to enable near field communications between the mobile device 104 and the payment terminal. In various embodiments, and as illustrated in FIG. 5C, the system may display a second payment process page 580 in response to completing process 900. Page 580 may include a status message 582 indicating successful completion of process 900.

Figure 6:
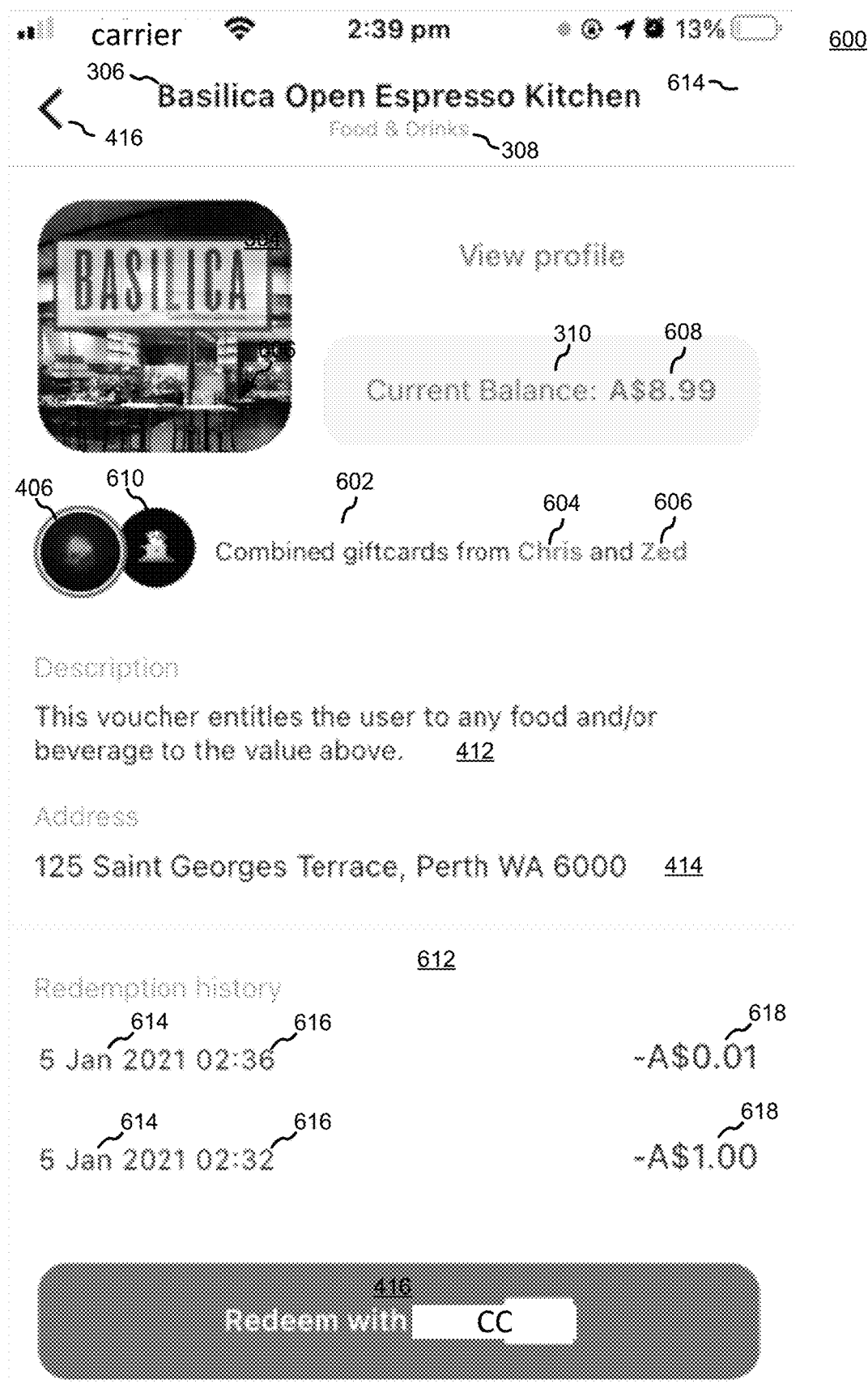
FIG. 6 illustrates a gift card details page of the system, in accordance with various embodiments.

In various embodiments, and with additional reference to FIG. 6, a gift card details page 600 is illustrated as displayed on a user device 104 via the mobile app 110. Gift card details page 600 includes similar information to gift card details page 400 such as merchant name 306, merchant type 308, current balance 310, description field 412, and address field 414. Page 600 may display a combined gift cards notice 602 indicating that at least two gift cards associated on a one-to-one basis with the customer and merchant have been combined. For example, a first gifting user 604 ("Chris") and a second gifting user 606 ("Zed") may purchase a gift card from the same merchant and may send the gift cards to the receiving user. The system may automatically match like cards based on the merchant, the receiving user, the description, the address, and/or the like. The system may generate a combined balance 608 for all gift cards thus matched with the receiving user. In this regard, the system may tend to enhance the convenience and utility of gift cards by combining multiple independent gift card balances into a single balance which may be drawn upon for gift card based transactions. In various embodiments, page 600 may display a second profile picture 610 associated with the second gifting user 606. In various embodiments, page 600 may display a redemption history frame 612 in response to completing a payment transaction via process 900. The redemption history frame 612 may include a transaction date 614, a transaction time 616, and an associated transaction amount 618. Accordingly, the system improves the user interface by consolidating similar gift cards to reduce the amount of space used on the screen and improve the understanding and access to the information in the user interface.

Figure 7A:
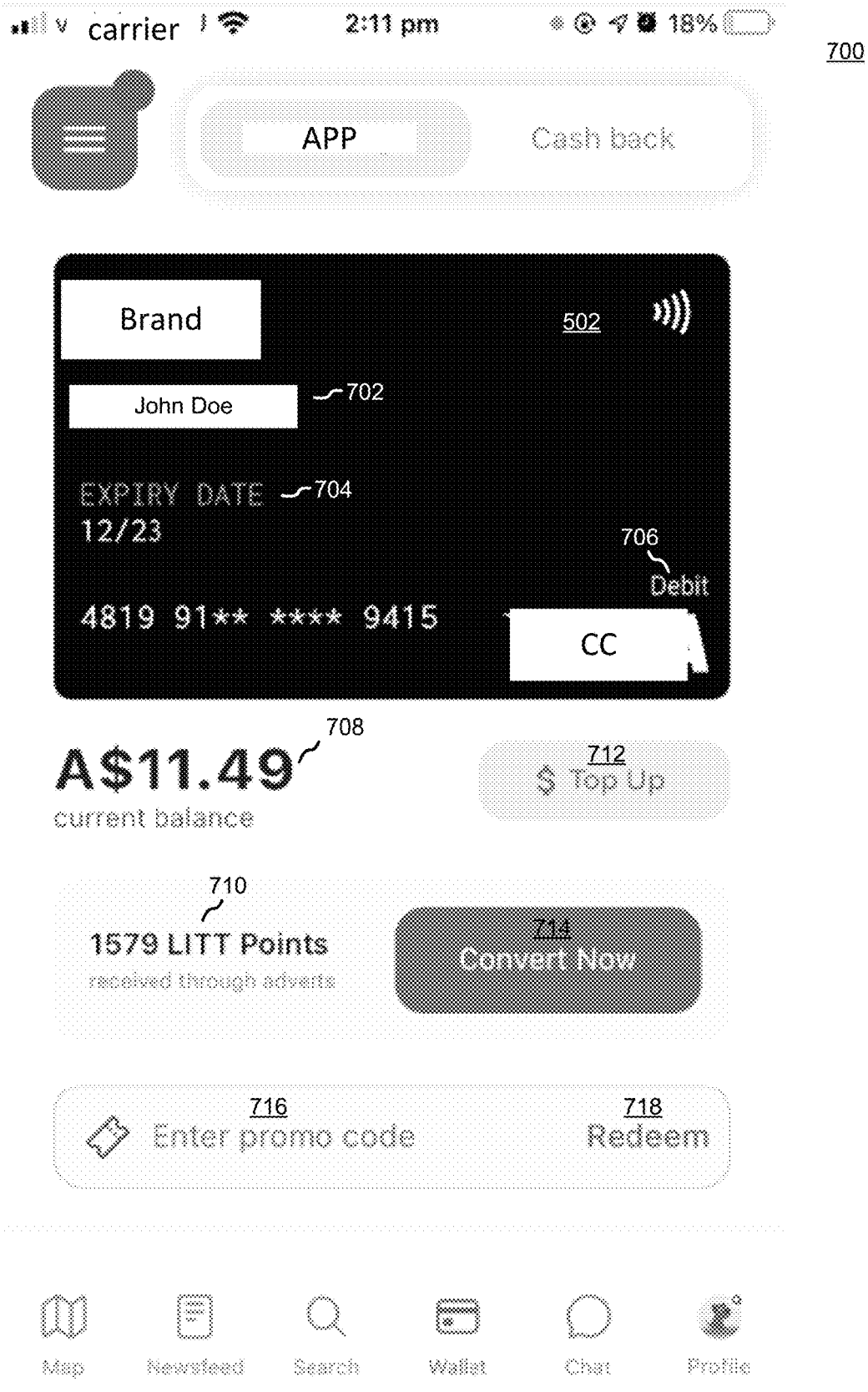
FIG. 7A illustrates a wallet details page of the system, in accordance with various embodiments.

In various embodiments, and with additional reference to FIG. 7A, a wallet details page 700 of the system is illustrated as displayed on a user device 104 via the mobile app 110. Page 700 may include virtual payment card display 502 and card details such as cardmember name 702, card expiration date 704, and payment card type 706 such as, for example, debit or credit. Page 700 includes an account balance 708 associated with the payment card. In various embodiments, page 700 includes a top up button 712. In response to a user interaction with the top up button 712 the system may start a top up process 800 to add additional funds to the current account balance 708. Page 700 may include a points balance 710 associated with the customer. In various embodiments, the system may generate and award points to a customer in response to customer interactions with advertisements. For example, the system may award 500 points in response to a customer interacting (via mobile app 110) with a banner type advertisement of advertising 212 module. Page 700 may include a convert now button 714. In various embodiments, in response to a user interaction with the convert now button the system may start a point conversion process. In various embodiments, the point conversion process may apply a conversion function (e.g., converting points to currency) to the points balance 710. In response to applying the conversion function, the system may debit the points balance 710 and credit the account balance 708 accordingly. In various embodiments, page 700 may include a promotional code field 716 and a code redemption button 718. In response to receiving a promotional code via the promotional code field 716 and an interaction with the code redemption button 718 the system may credit the points balance 710 and/or the account balance 708.

In various embodiments, and with additional reference to FIG. 7B, a transaction history page 750 of the system is illustrated as displayed on a user device 104 via the mobile app 110. In various embodiments, page 750 may display one or more transaction details frames 752. The transaction details frame 752 may include a transaction date 754 and a transaction amount 756. The system may, via the transaction amount 756, indicate whether the transaction was a credit or debit of the account balance. For example, credit transactions may be shown in green text and debit transactions may be shown in black text and include a negative sign. In various embodiments the transaction details frame 752 may include a transacting party name 758, for example, "LITT," "the_left_bank," "nbcbeerland," and/or the like. The transaction details frame 752 may include a transaction narrative 760 indicating the type and nature of the transaction. For example, the transaction narrative may be, "Promo Code—LITT" where the user has entered a promotional code. In another example, the transaction narrative may be, "Loyalty Cash Back—The Left Bank" where the customer has received a cash back credit from a merchant (i.e. "The Left Bank"). In another example, the transaction narrative may be "LITT Card Payment—Northbridge Brewing Co" where the customer has completed a payment transaction to a merchant (i.e. "Northbridge Brewing Co"). In various embodiments, the transaction details frame 752 may include an icon 762 associated with the transacting party.

Figure 8:
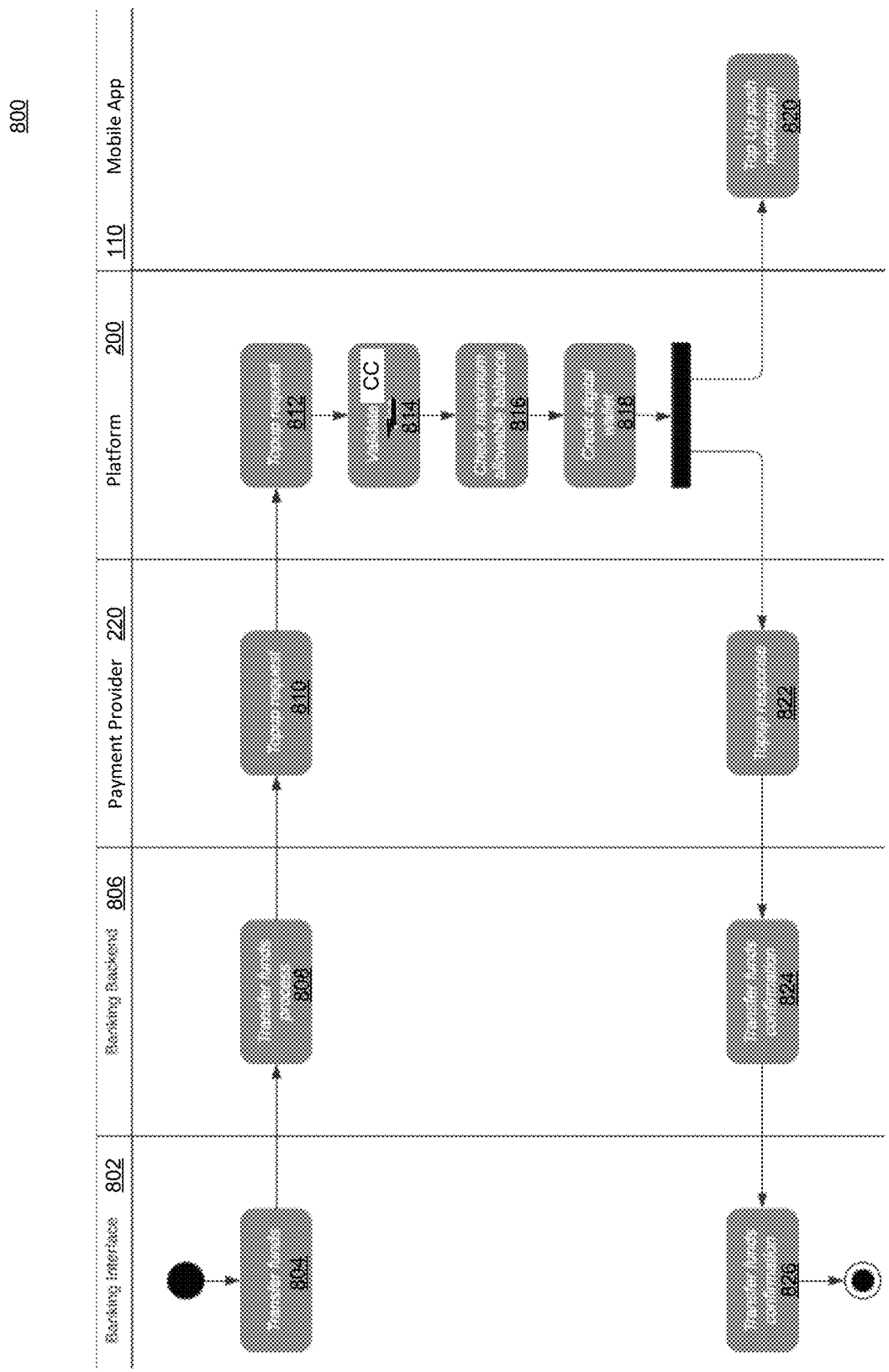
FIG. 8 illustrates a top up process of the system, in accordance with various embodiments.

In various embodiments, and with additional reference to FIG. 8, a topup (e.g., refill) process 800 of system 100 is illustrated. In various embodiments, process 800 may be started in response to receiving a user interaction with the top up button 712. In various embodiments, the system may open a punch out (e.g., an interface, application programming interface (API), etc.) to a banking interface and may generate a transfer funds request (step 804). The transfer funds request may include a transfer amount and a customer information. The system may pass the transfer funds request to a banking backend 806 for further processing. The banking backend may perform further processing of the transfer funds request and pass the further processed transfer funds request to the digital payment service provider 220 (step 808). In various embodiments, in response to receiving the further processed transfer funds request the digital payment service provider may generate a topup request message based on the further processed transfer funds request (step 810). In various embodiments, the topup request messages includes a transfer amount and Pseudo-Primary Account Number (PPAN). The PPAN may be associated with a branded or unbranded credit card, debit card, or prepaid card, among others. Platform 200 may receive the topup request message (step 812). In response to the topup request message, the system may validate the message against a database of existing customers via a key field search based on the PPAN (step 814).

In response to validating the customer, the system may check for violation of a maximum allowable balance threshold (e.g., A$1,000) (step 816). For example, the system may recall a current wallet balance associated with the PPAN (e.g., A$500) and sum the current balance with the transfer amount (e.g., A$50) to generate an after transfer balance (e.g., A$550). In various embodiments, in response to determining the after transfer balance is greater than the maximum allowable balance threshold, the system may halt process 800 and may generate an error. In this regard, the platform 200 may reject the topup request in response to exceeding the maximum allowable balance threshold. In response to determining the after transfer balance is less than or equal to the maximum allowable balance threshold, the system may set the current wallet balance associated with the PPAN to the after transfer balance (step 818). In various embodiments, in response to setting the current balance associated with the PPAN to the after transfer balance the system may generate a top up push notification and send the top up push notification to the mobile app 110 associated with the PPAN (step 820). In various embodiments, the system may generate a topup response message and transmit the topup response message to the digital payment service provider 220 (step 822). In response, the digital payment service provider 220 may pass the topup response message to the banking backend 806. In various embodiments, the banking backend 806 may generate a transfer funds confirmation message (step 824). The banking backend 806 may pass the transfer funds confirmation message to the banking interface 802 which may display a transfers funds confirmation via a user device (step 826).

Figure 9:
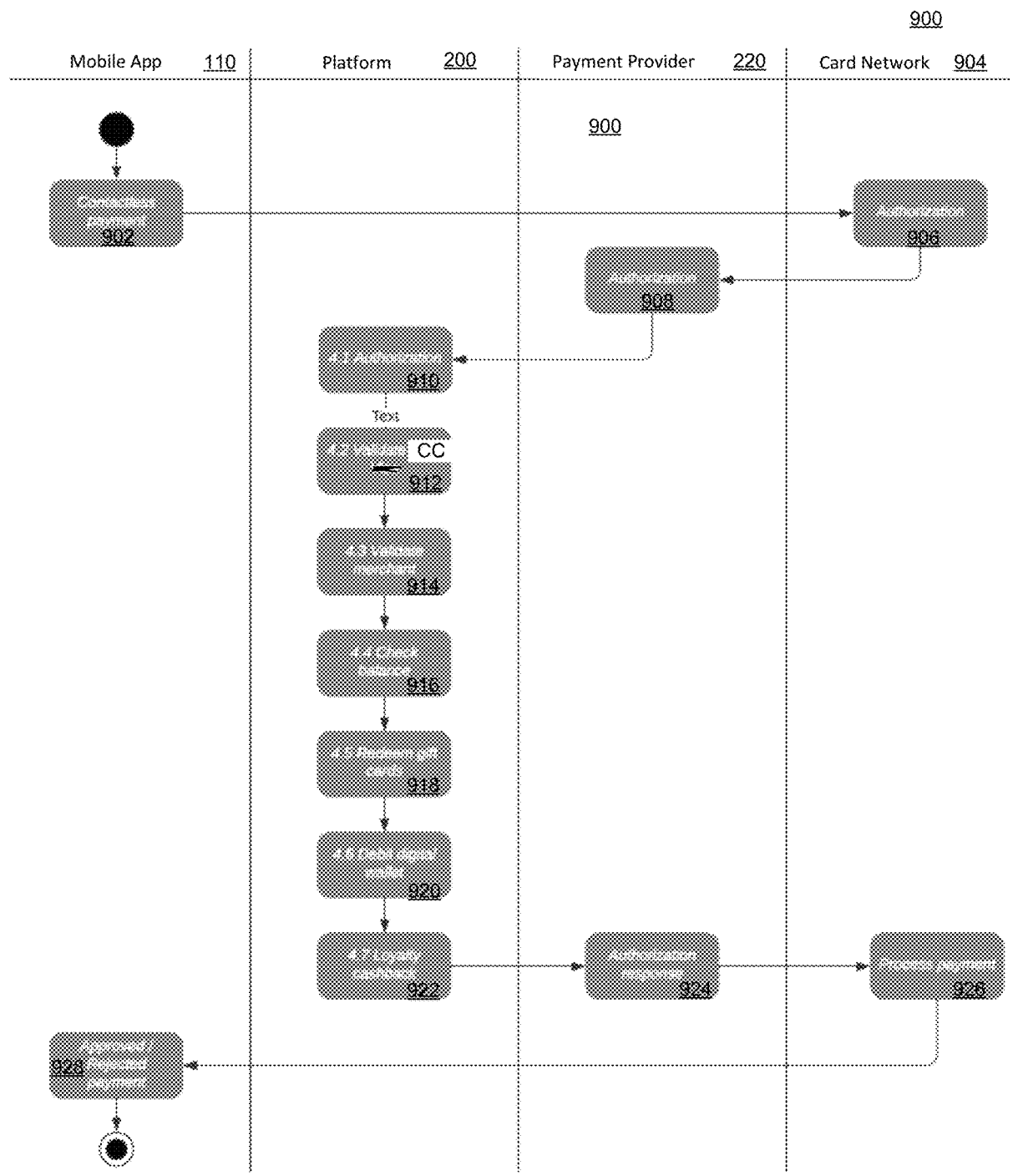
FIG. 9 illustrates a process for gift card based payments of the system, in accordance with various embodiments.

In various embodiments, and with additional reference to FIG. 9, a process 900 for gift card based payments is illustrated. Process 900 may start in response to a customer initiating a contactless payment at a merchant via the mobile app 110 (step 902). In response to initiating the contactless payment, a card network 904 may start an authorization process to generate an authorization message (step 906). The card network 904 may pass the authorization message to the digital payment service provider 220. The digital payment service provider 220 may further process the authorization message and may pass the authorization message to the platform 200 (step 908). In various embodiments, the authorization message may comprise a transaction number, a timestamp, a PPAN, a currency type, an amount, a transaction code, a transaction type, a description, an acquirer ID, a merchant ID, a merchant name, a terminal ID, a reference number, one or more product IDs, and/or the like. In response to receiving the authorization message, the platform 200 may execute an authorization process (step 910). Upon completing the authorization process, the platform 200 may execute a payment card validation process to determine if the authorized transaction is associated with a customer (step 912). In response to validating the payment card, the platform 200 may execute a merchant validation process to determine whether the authorized transaction is associated with a merchant (step 914).

In response to determining the authorized transaction is associated with system users (i.e., both a customer and a merchant) the platform 200 may check the available gift card account balance of the customer associated with the merchant (step 916). In response to determining an available gift card account balance associated with the merchant, the platform 200 may execute a gift card redemption process to redeem the associated gift card account balance (step 918). In various embodiments, in response to an output of the gift card redemption process the platform 200 may execute a digital wallet debit process and thereby pay any remaining balance of the transaction amount unable to be paid from the available gift card balance (step 920). In this regard, the platform 200 enables payment of merchant transactions by simultaneous assignment of debits to both gift card balances associated with the customer and the wallet balance associated with the customer thereby tending to enhance the utility of gift cards by fully spending remaining gift card balances. Furthermore, the processes of the platform 200 tend to enhance the speed of payment transactions by enabling hybrid payment of a single transaction. That is, using multiple payments sources in a single transaction. In various embodiments, in response to completing the digital wallet debit process, the platform 200 may execute a loyalty cashback process which may apply a credit to the customers wallet balance based on the transaction amount (step 922). In response to completing the loyalty cashback process, the platform 200 may send an authorization response message to the digital payment service provider 220 (step 924). The digital payment service provider 220 may pass the authorization response message to the card network 904. In response to receiving the authorization response message, the card network 904 may execute a payment process (step 926). In various embodiments, the payment process may generate an approval message or a payment rejected message based on the authorization response message. The card network 904 may pass the corresponding message to the mobile app 110 which may display a payment approval or payment rejection notice in response (step 928). In various embodiments, the card network 904 may send the corresponding message to the platform 200 to forward to mobile app 110. In various embodiments, platform 200 may additionally generate an authorized purchase message to send to a merchant portal (e.g., a kiosk, a gate, a locker, an area, etc.). The merchant portal may activate a motor, a door and/or a lever to allow the customer access to retrieve a purchased item and/or leave a merchant area with the purchased item. The authorized purchase message may include the transaction number, the timestamp, the currency type, the amount, the transaction code, the transaction type, the description, the acquirer ID, the merchant ID, the merchant name, the terminal ID, the reference number, the one or more product IDs, a portal ID, and/or the like. Platform 200 may then transmit the authorized purchase message to the merchant portal. The merchant portal may verify certain data in the authorized purchase message, and based on the verification, the merchant portal may grant the customer access to the purchased item. In various embodiments, access to the merchant portal may include opening a door, lifting a gate, providing access to an area, displaying a product, rotating a platform, and/or causing other mechanical or physical access that allows the customer to take the purchased item and/or leave the merchant area.

As described above, process 900 improves upon existing technology by enabling hybrid payment transactions. That is, transaction speeds are improved by consolidating the payment process to include gift cards, loyalty points, digital wallets, and credit card payments in a single transaction. In that regard, platform 200 may use less processing time and bandwidth, among other resources to complete the consolidated payment transaction that would otherwise be used by sending a payment transaction for each payment type (e.g., gift card, loyalty points, credit card, etc.).

Figure 10:
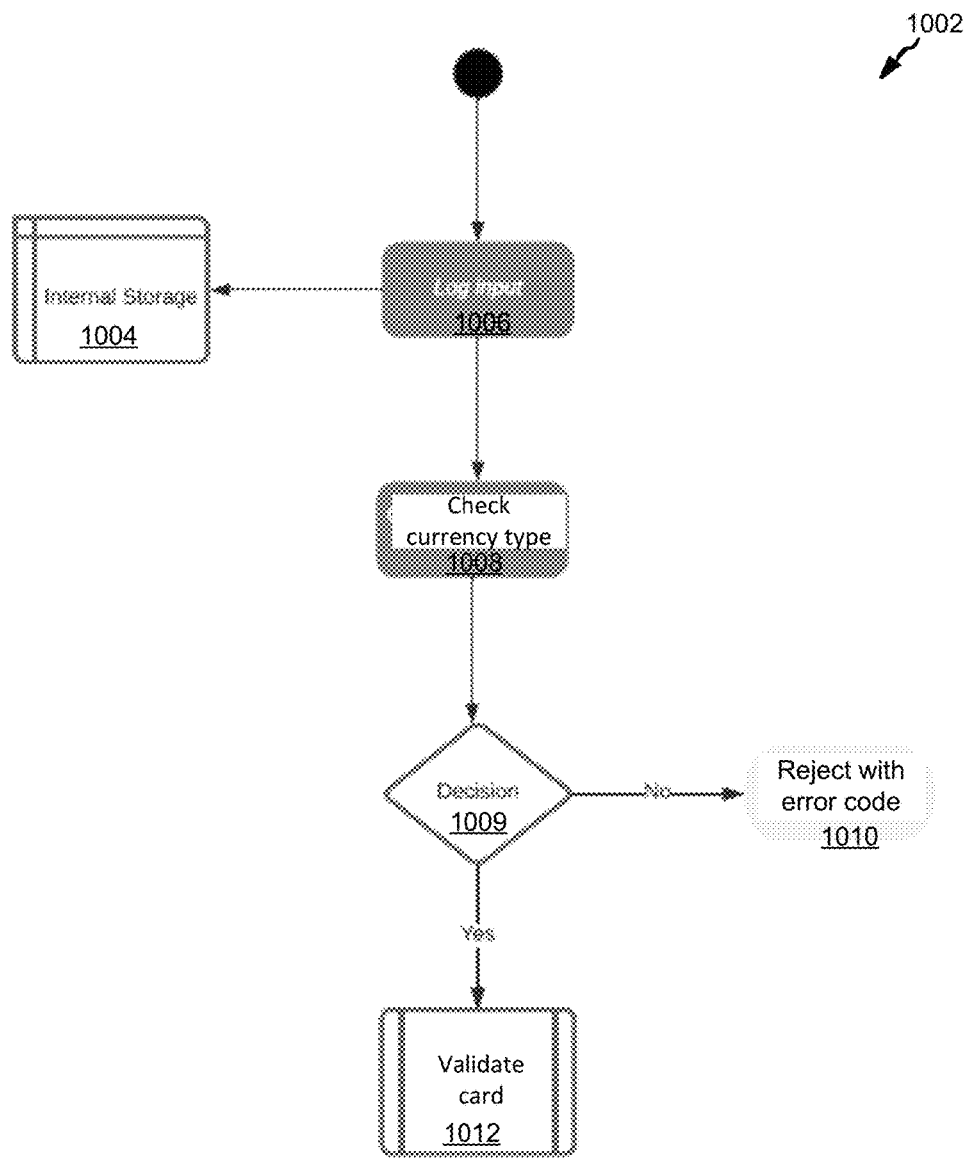
FIG. 10 illustrates an authorization process of the system, in accordance with various embodiments.

In various embodiments, and with additional reference to FIG. 10, an authorization process 1000 of system 100 is illustrated. In various embodiments, platform 200 may perform the steps of the authorization process 1000. In response to receiving an authorization message 1002 the platform 200 may log the received authorization message 1002 into internal storage (i.e., a database of the platform 200) 1004 (step 1006). The platform 200 may check whether the currency type is an approved currency type (step 1008). For example, the approved currency type may be Australian Dollars (AUD) and the platform 200 may reject transactions with a currency type which is not AUD. In response to determining that the currency type is not an approved currency type (step 1009), the platform 200 may generate an error code (step 1010). For example the platform 200 may generate an error code '101 Invalid Currency' and return the error code to the digital payment service provider 220. In response to determining that the currency type is an approved currency type (step 1009), the platform 200 may progress to payment card validation process (step 1012).

Figure 11:
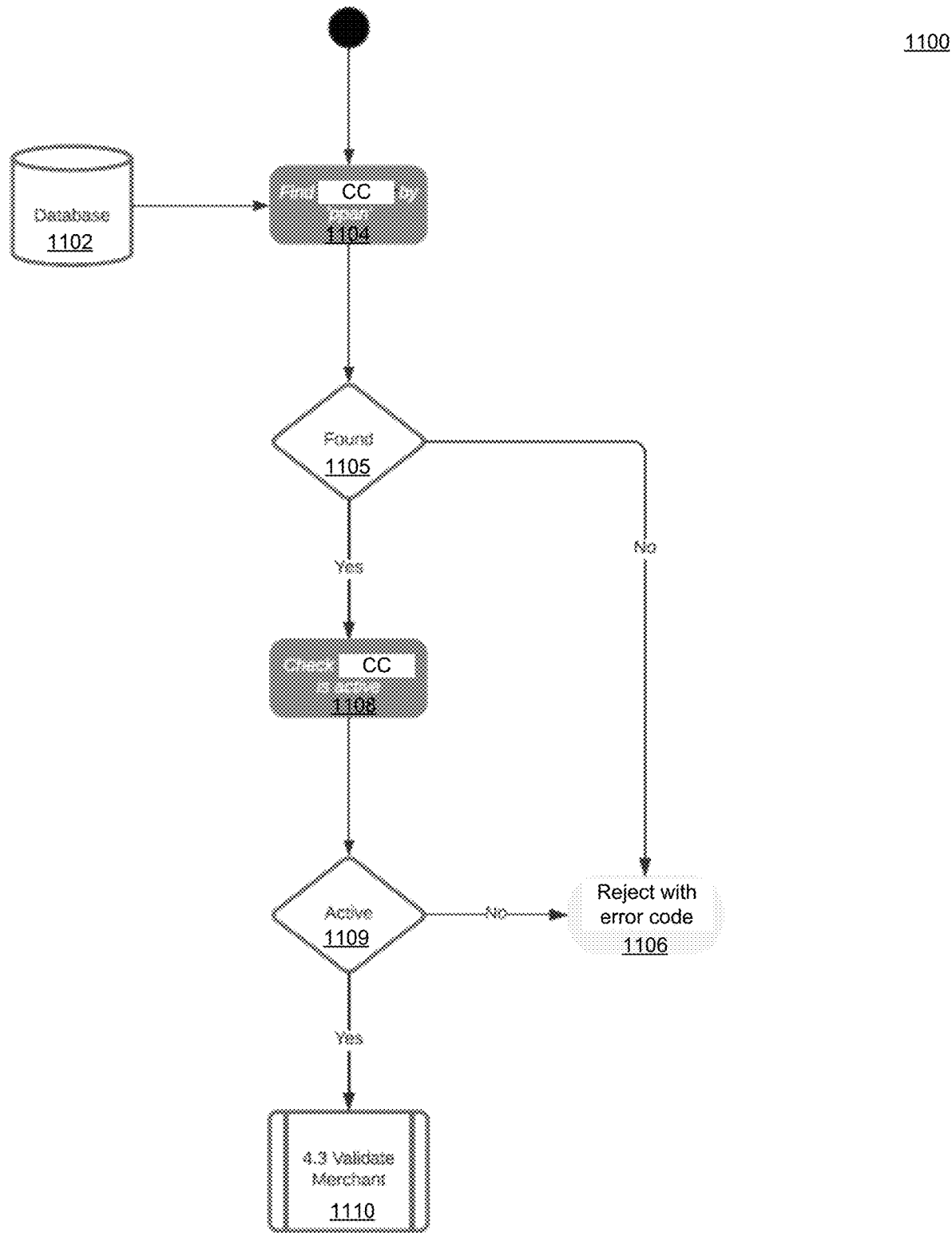
FIG. 11 illustrates a payment card validation process of the system, in accordance with various embodiments.

In various embodiments, and with additional reference to FIG. 11, a payment card validation process 1100 of system 100 is illustrated. In various embodiments, platform 200 may perform the steps of the payment card validation process 1100. The platform 200 may strip the PPAN from the authorization message and perform a key field search based on the PPAN of a database 1102 comprising customer data associated with PPANs (step 1104). Where no records are returned from the database 1102 (step 1105), the platform 200 may generate an error code and reject the authorization message (step 1106). For example, the platform 200 may generate an error code '217 Card Not Found' and return the error code to the digital payment service provider 220. In response to returning a customer record (step 1105) associated with the PPAN, the platform 200 may determine whether there is an active customer account associated with the PPAN (step 1108). For example, the platform 200 may check the customer record for an activity flag or a wallet account or may compare a current date with a payment card expiration date associated with the PPAN. In response to determining the customer account associated with the PPAN is not active (step 1109), the platform 200 may generate an error code (step 1106). For example, the platform 200 may generate an error code '207 Account Inactive' and return the error code to the digital payment service provider 220. In response to determining the customer account associated with the PPAN is active (step 1109), the platform 200 may proceed to a merchant validation process (step 1110).

Figure 12A:
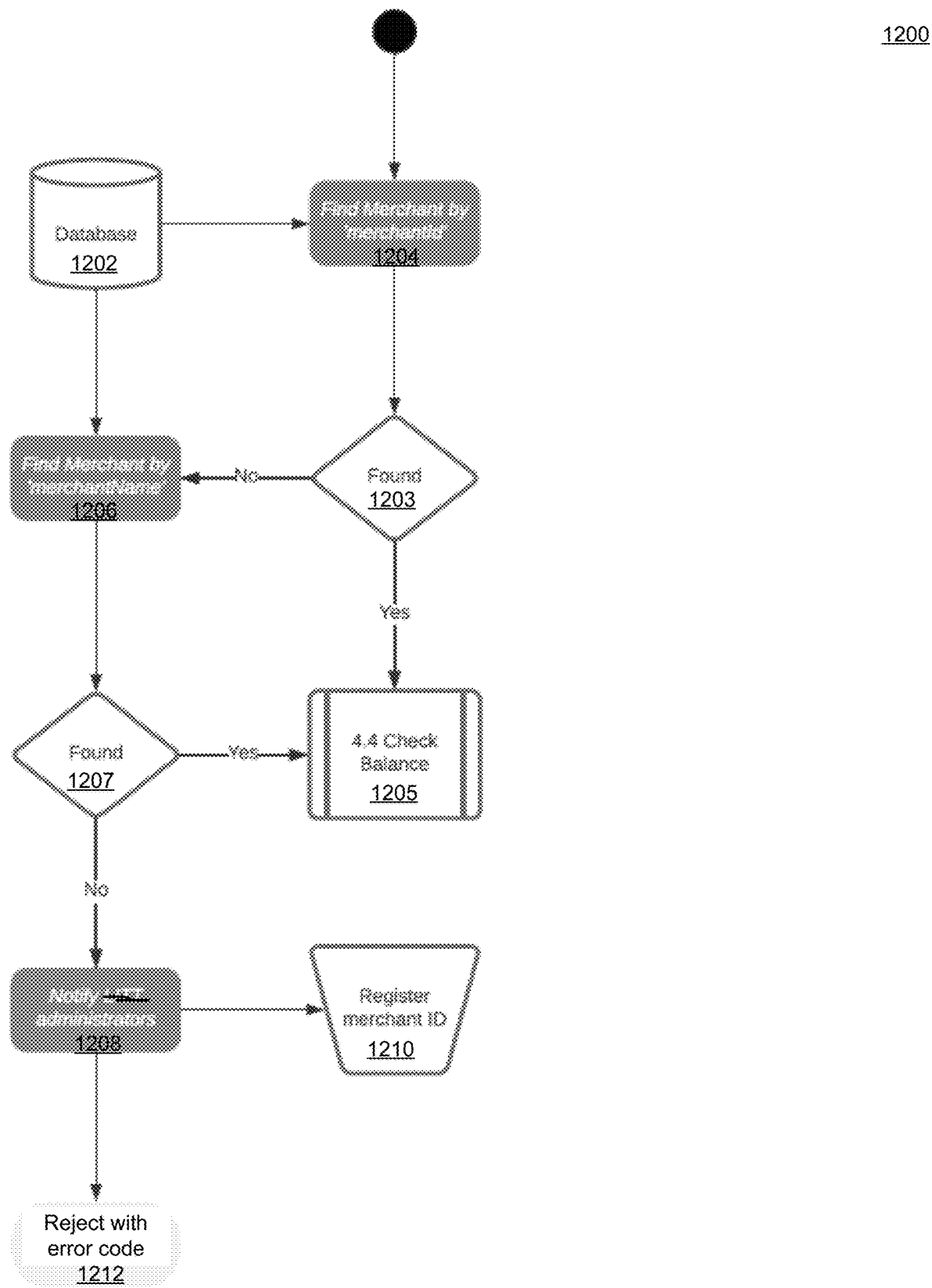
FIG. 12A illustrates a merchant validation process of the system, in accordance with various embodiments

In various embodiments, and with additional reference to FIG. 12A, a merchant validation process 1200 of system 100 is illustrated. In various embodiments, platform 200 may perform the steps of the merchant validation process 1200. The platform 200 may strip the merchant ID from the authorization message and perform a key field search based on the merchant ID of a database 1202 comprising merchant data associated with merchant ID and with a merchant name (step 1204). In response to returning a record associated with the merchant ID (step 1203), the platform 200 may proceed to a balance check and redemption process (step 1205). Where no record is returned, the platform 200 may strip the merchant name from authorization message and perform a key field search based on the merchant name of the database 1202 (step 1206). In response to returning a record associated with the merchant name (step 1207), the platform 200 may proceed to the balance check and redemption process (step 1205). Where no record is returned, the platform 200 may generate a notice to system administrators (step 1208). In various embodiments, the platform 200 may reject the authorization message and generate an error code (step 1212). For example, the platform 200 may generate an error code '103 Unauthorize' and return the error code to the digital payment service provider 220. In various embodiments, in response to the notice to system administrators the platform 200 may start a merchant ID registration process (step 1210).

Figure 12B:
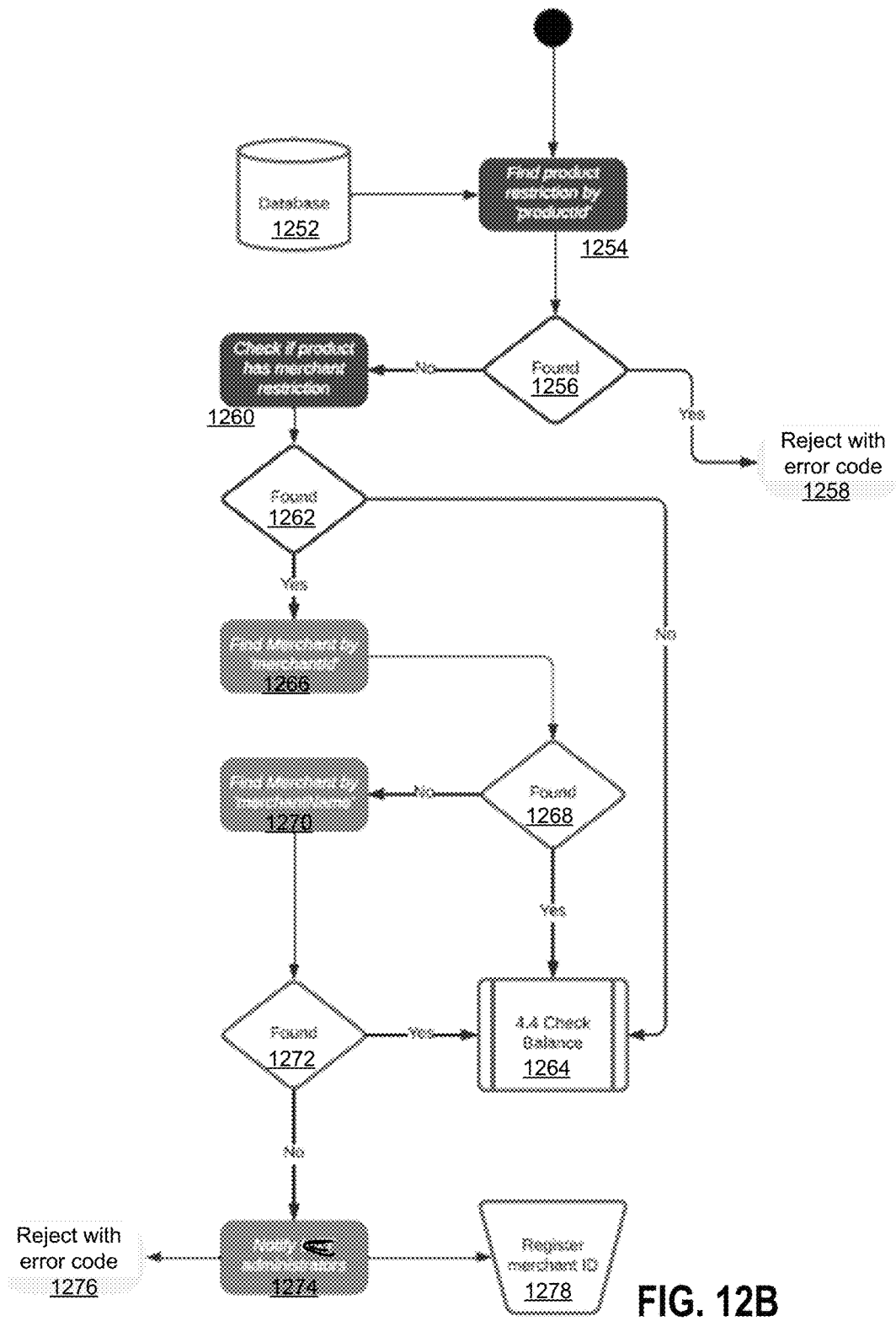
FIG. 12B illustrates a product and merchant validation process of the system, in accordance with various embodiments.

In various embodiments, and with additional reference to FIG. 12B, a merchant and product validation process 1250 of system 100 is illustrated. In various embodiments, platform 200 may perform the steps of the merchant and product validation process 1250. In various embodiments, the merchant and product validation process 1250 may restrict the purchase of a product to a specific merchant. The platform 200 may strip the merchant ID and the one or more product IDs from the authorization message and perform a key field search based on the merchant ID and the one or more product IDs of a database 1252 comprising merchant data associated with merchant ID and with a merchant name and product data associated with product ID (step 1254). In various embodiments, database 1252 may comprise a first database comprising merchant data and a second database comprising product data. In response to not returning a record associated with the product ID (step 1256), the platform 200 may reject the authorization message and generate an error code (step 1258). In response to returning a record associated with the product ID (step 1256), the platform 200 may proceed to a merchant restriction check (step 1260). The platform 200 may check whether the product ID is restricted to a merchant identified by a merchant ID and/or a merchant name. In response to the record not including a merchant ID and/or merchant name restriction (step 1262), the platform 200 may proceed to a balance check and redemption process (step 1264). In response to the record including a merchant restriction (step 1262), the platform 200 may find the merchant by the merchant ID (step 1266). In various embodiments, the merchant ID may be included in the record. In various embodiments, the platform 200 may perform a key field search based on the merchant ID of the database 1202. In response to finding the merchant by the merchant ID (step 1268), the platform 200 may proceed to the balance check and redemption process (step 1264). In response to not finding the merchant by the merchant ID (step 1268), the platform 200 may proceed to find the merchant by the merchant name (step 1270). In various embodiments, the merchant name may be included in the record. In various embodiments, the platform 200 may perform a key field search based on the merchant name of the database 1252. In response to finding the merchant by the merchant name (step 1272), the platform 200 may proceed to the balance check and redemption process (step 1264). Where no record is returned (step 1272), the platform 200 may generate a notice to system administrators (step 1274). In various embodiments, the platform 200 may reject the authorization message and generate an error code (step 1276). For example, the platform 200 may generate an error code '103 Unauthorized' and return the error code to the digital payment service provider 220. In various embodiments, in response to the notice to system administrators the platform 200 may start a merchant ID registration process (step 1278).

As described above, processes 1200 and 1250 improve upon existing technology by enabling purchases at a specific merchant, enabling the purchase of a specific product to be associated with a specific merchant, and enabling the purchase of a specific product at multiple merchants. In that regard, system 100 and platform 200 improve the performance of computer systems by consolidating the decision making processes and reduce the overall number of network connections and messages used to provide robust and complex transactions of products with merchants.

Figure 13:
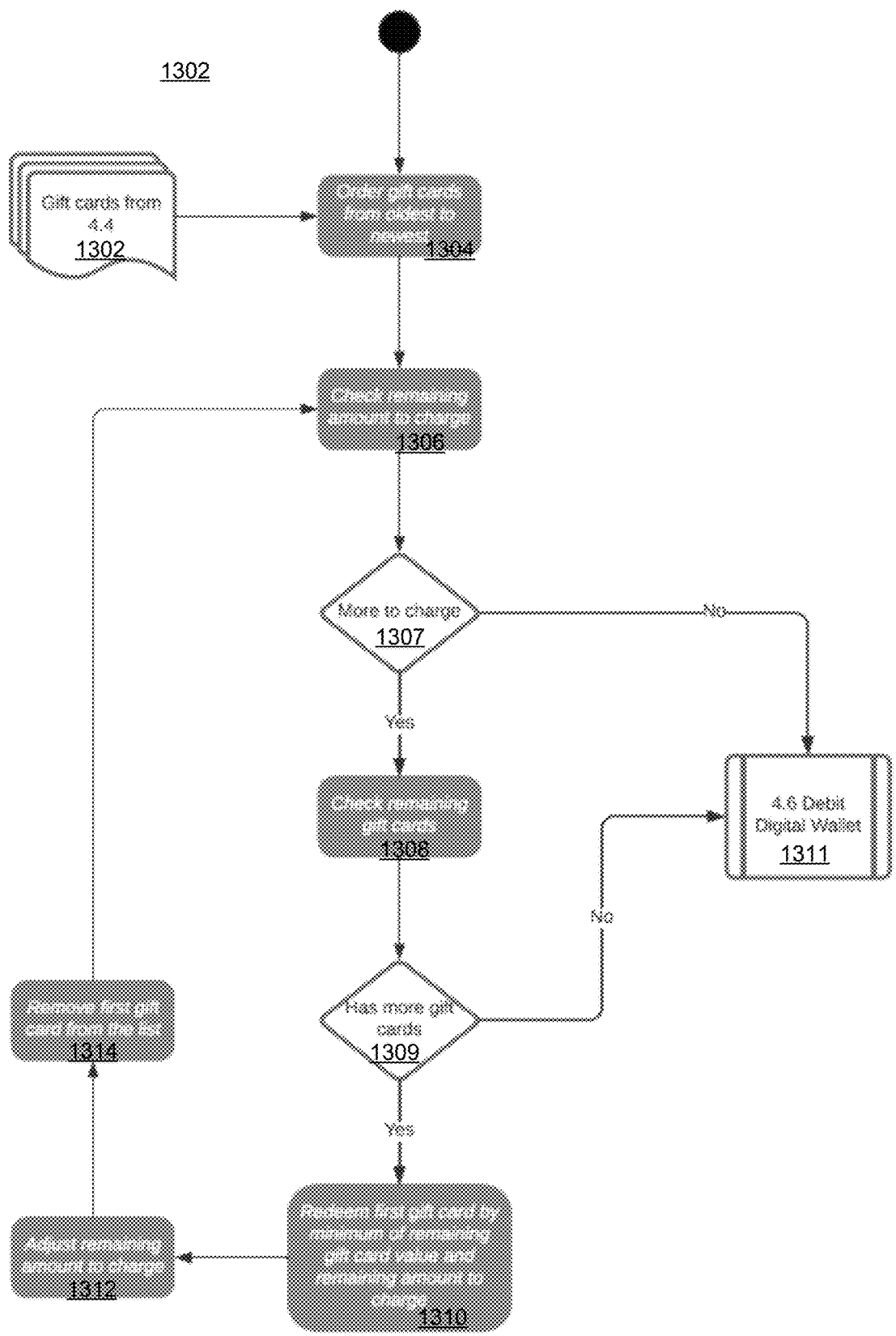
FIG. 13 illustrates a balance check and redemption process of the system, in accordance with various embodiments.

In various embodiments, and with additional reference to FIG. 13, a balance check and redemption process 1300 of system 100 is illustrated. In various embodiments, platform 200 may perform the steps of the balance check and redemption process 1300. The platform 200 may recall each of the gift cards associated with the customer record from a database of gift cards 1302 and order each of the gift cards associated with the customer record from oldest to newest (step 1304). For example, the platform 200 generate a gift card balance array comprising a gift card balance and an expiration date of each of the gift cards associated with the customer record and the merchant ID or merchant name (e.g., 5.25, Jan. 1, 2025; 5.00, Jan. 9, 2025, 20.00, Jun. 4, 2023). The platform 200 may sort the gift card balance array in reverse chronological order based on the expiration date to generate an ordered gift card balance array (e.g., 20.00, Jun. 4, 2023; 5.25, Jan. 1, 2025; 5.00, Jan. 9, 2025).

The platform 200 may strip an amount (e.g., 59.25) from the authorization message and determine if there is a remaining amount to charge (step 1306). For example, the platform 200 may set a current charge amount to the amount from the authorization message and, where the current charge amount is non-zero the platform 200 may determine there is a remaining amount to charge. In response to there being no remaining amount to charge (step 1307), the platform 200 may progress to a digital wallet debit process. In response to there being a remaining amount to charge (step 1307) the platform 200 may determine whether there are available gift cards to be charged (step 1308) For example, the platform 200 may recall the ordered gift card balance array and check for any non-zero gift card balances. In response to determining there are available gift cards to be charged (step 1309), the platform 200 may redeem the available gift card balance against the charge amount (step 1310). If no gift card balances are available (step 1309), the platform 200 may progress to the digital wallet debit process (step 1311). The platform 200 may adjust a remaining amount to charge by the redeemed gift card balance (step 1312). In various embodiments, in response to the gift card being fully redeemed, the platform 200 may remove the gift card from the list of gift cards associated with the customer record (step 1314). For example, the platform 200 may decrement the remaining charge amount by sequentially applying the balances in the ordered gift card balance array until either the remaining charge amount is zero or each of the gift card balances of the ordered gift card balance array are zero. In response to zeroing a balance element of the ordered gift card array, the platform 200 may shorten the array by removing the balance element and associated date element. In this regard, the platform 200 sequentially applies the balances of a plurality of gift cards to the remaining charge amount thereby tending to enhance the utility of gift cards by ensuring older gift cards are used before their expiry date and by aggregating remaining gift card balances so that they may be fully applied to a payment transaction.

As described above, process 1300 improves the user experience and the functioning of the computer systems. Fewer transactions may be used to purchase products by aggregating and consolidating multiple gift cards into a single transaction. Furthermore, the user interface may be simplified by platform 200 aggregating the gift cards and using the oldest gift cards first without the user sorting through gift cards and manually selecting the order to use.

Figure 14:
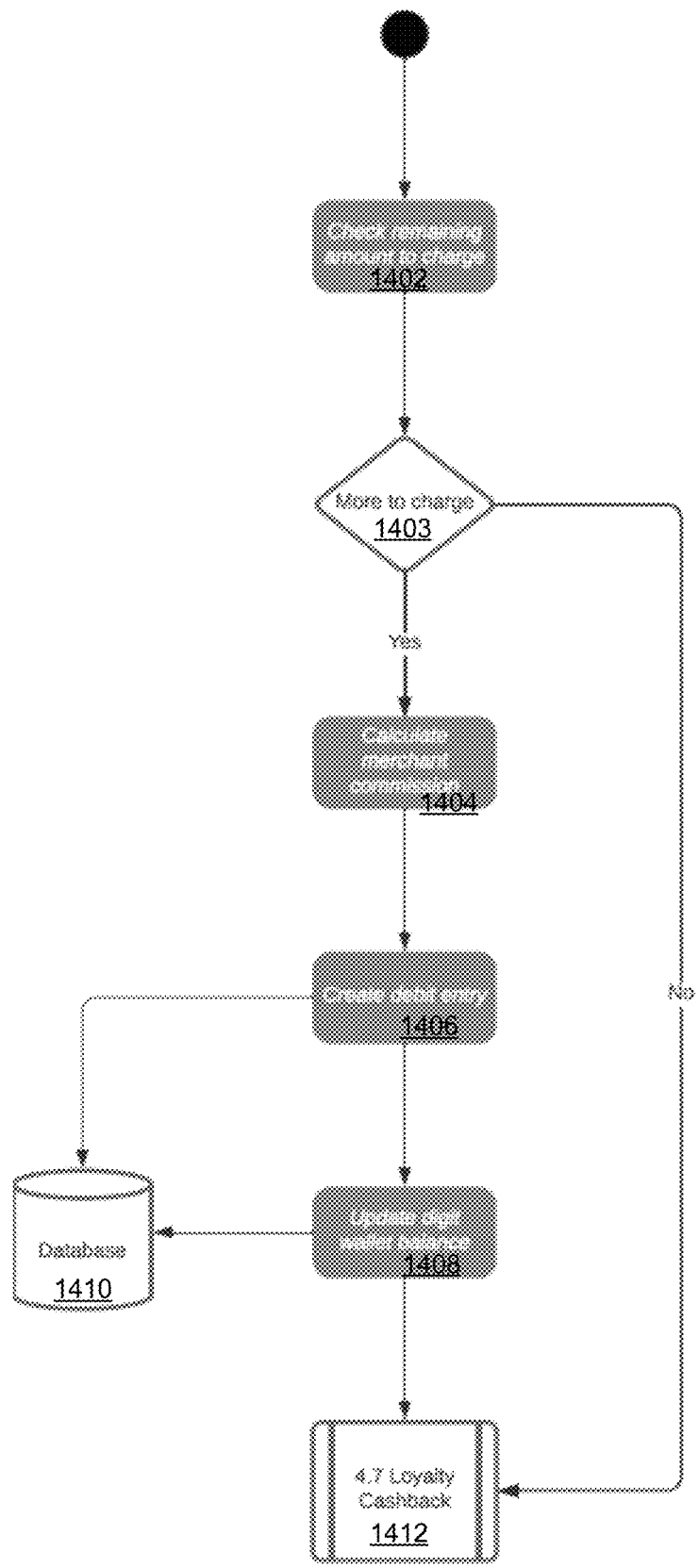
FIG. 14 illustrates a digital wallet debit process of the system, in accordance with various embodiments.

In various embodiments, and with additional reference to FIG. 14, a digital wallet debit process 1400 of system 100 is illustrated. In various embodiments, platform 200 may perform the steps of the digital wallet debit process 1400. The platform 200 may check whether there is a remaining amount to charge after completing process 1300 (step 1402). For example, the platform 200 may check the current charge amount and, where the current charge amount is non-zero the platform 200 may determine there is a remaining amount to charge. In response to determining there is no remaining amount to charge (step 1403), the platform 200 may progress to a loyalty cashback process (step 1412). In response to determining a remaining amount to charge (step 1403), the platform 200 may calculate a merchant commission based on the remaining charge amount (step 1404). For example, the platform 200 may apply a commission function to one of the current charge amount or the amount from the authorization message. The platform 200 may create a debit entry against a digital wallet balance associated with the customer record and record the debit entry in a digital wallet database 1410 (step 1406). The platform 200 may update the digital wallet balance associated with the customer record in database 1410 to a new value based on applying the debit entry (step 1408). In response to updating the digital wallet balance, the platform 200 may progress to the loyalty cashback process. In this regard the platform 200 enables hybrid gift card balance and cash (via digital wallet) payments thereby tending to enhance the utility of gift card payments by ensuring full spend of gift cards.

Figure 15:
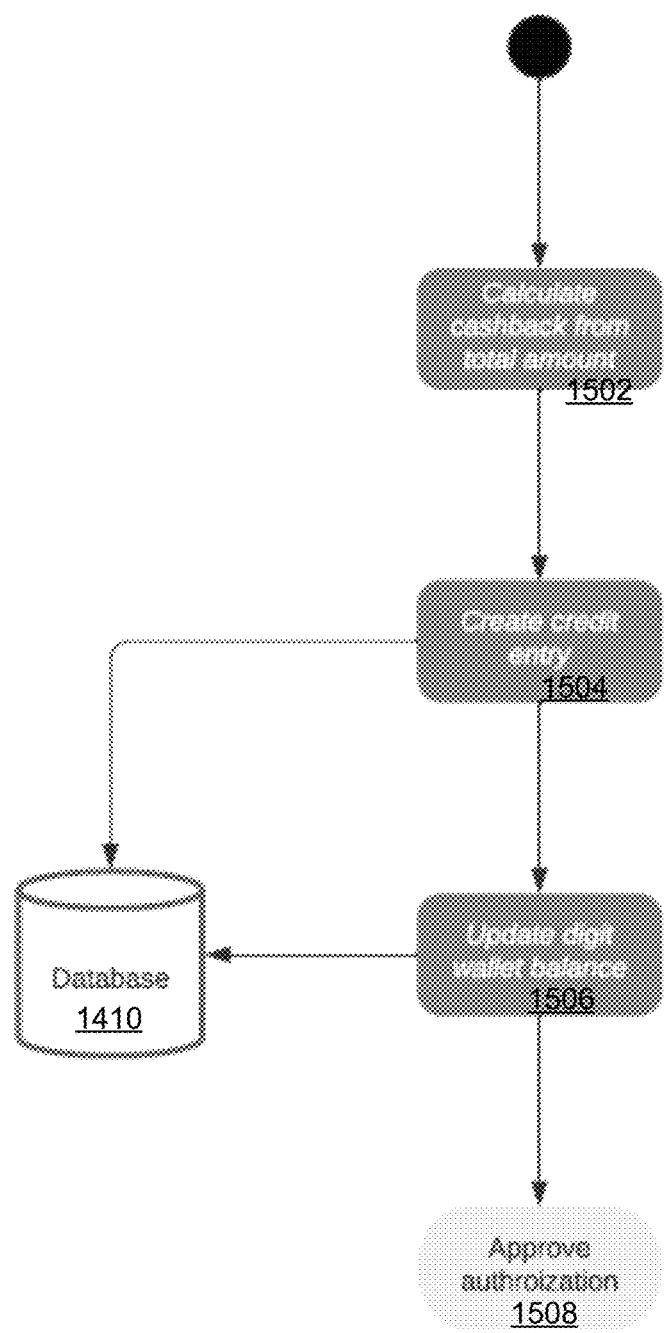
FIG. 15 illustrates a loyalty cashback process of the system, in accordance with various embodiments.

In various embodiments, and with additional reference to FIG. 15, a loyalty cashback process 1500 of system 100 is illustrated. In various embodiments, platform 200 may perform the steps of the loyalty cashback process 1500. The platform 200 may recall the amount from the authorization message and calculate a cashback amount based on the amount (step 1502). The platform 200 may create a credit entry against the digital wallet balance associated with the customer record and record the debit entry in the digital wallet database 1410 (step 1504). The platform 200 may update the digital wallet balance associated with the customer record in database 1410 to a new value based on applying the credit entry (step 1506). In response to applying the credit entry, the platform 200 may generate an approved authorization message and transmit the approved authorization message to the digital payment service provider 220 (step 1508).

The description herein is of various exemplary embodiments only, and is not intended to limit the scope, applicability or configuration of the present disclosure in any way. Rather, the description is intended to provide a convenient illustration for implementing various embodiments including the best mode. As will become apparent, various changes may be made in the function and arrangement of the elements described in these embodiments without departing from the scope of the appended claims.

For the sake of brevity, conventional techniques for mobile device application design and implementation, as well as conventional mobile device communications techniques, interface elements, and so forth, and/or the like, may not be described in detail herein. Furthermore, the connecting lines shown in various figures contained herein are intended to represent exemplary functional relationships and/or physical or communicative couplings between various elements. It should be noted that many alternative or additional functional relationships or communicative connections may be present in a practical system or related methods of use, for example a mobile gift card marketplace.

The system may include remote access to data, standardizing data and allowing remote users to share information in real time. The system may allow users to access data (e.g., data from digital gift cards, etc), and receive updated data in real time from other users. The system may store the data (e.g., in a non-standardized format) in a plurality of storage devices, provide remote access over a network so that users may update the data that was in a non-standardized format (e.g., dependent on the hardware and software platform used by the user) in real time through a GUI, convert the updated data that was input (e.g., by a user) in a non-standardized form to the standardized format, automatically generate a message (e.g., containing the updated data) whenever the updated data is stored and transmit the message to the users over a computer network in real time, so that the user has immediate access to the up-to-date data. The system may allow remote users to share data in real time in a standardized format, regardless of the format (e.g. non-standardized) that the information was input by the user.

The system may include a filtering tool that is remote from the end user and provides customizable filtering features to each end user. The system may also include a filtering tool that is remote from the end user and provides customizable filtering features to each end user. The filtering tool may provide customizable filtering by filtering access to the data. The filtering tool may identify data or accounts that communicate with the server and may associate a request for content with the individual account. The system may include a filter on a local computer and a filter on a server. The filtering tool may identify information or accounts that communicate with the server, and associate a request for content with the individual account. The system may include a filter on a local computer and a filter on a server.

The system may store elements from different host web sites in a database, then when a user accesses the database, the system may provide a hybrid webpage that merges content or documents from the different host websites. Upon access, the system may merge the content from the various websites and provide a link to the user to access the merged data in the form of an image-based document.

The system may train a neural network when using artificial intelligence or machine learning. The system may include an expanded data set of past data to train the neural network. The expanded training set may be developed by applying mathematical algorithms to the acquired set of data. The neural network is then trained with the expanded data set using a machine learning algorithm that uses a mathematical function to adjust certain weighting. The system may also use an iterative training algorithm to re-train with additional data.

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and communicative changes may be made without departing from the spirit and scope of the disclosure. Thus, the detailed description herein is presented for purposes of illustration only and not of limitation. For example, the steps recited in any of the method or process descriptions may be executed in any suitable order and are not limited to the order presented. Moreover, certain of the functions or steps may be outsourced to or performed by one or more third parties. Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set. Furthermore, any reference to singular includes plural embodiments, and any reference to more than one component may include a singular embodiment. Although specific advantages have been enumerated herein, various embodiments may include some, none, or all of the enumerated advantages.

Systems, methods, and computer program products are provided. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

As used herein, "satisfy," "meet," "match," "associated with", or similar phrases may include an identical match, a partial match, meeting certain criteria, matching a subset of data, a correlation, satisfying certain criteria, a correspondence, an association, an algorithmic relationship, and/or the like. Similarly, as used herein, "authenticate" or similar terms may include an exact authentication, a partial authentication, authenticating a subset of data, a correspondence, satisfying certain criteria, an association, an algorithmic relationship, and/or the like.

Terms and phrases similar to "associate" and/or "associating" may include tagging, flagging, correlating, using a look-up table or any other method or system for indicating or creating a relationship between elements, such as, for example: (i) a trading account and (ii) an order (e.g., contract, security, future) and/or digital channel. Moreover, the associating may occur at any point, in response to any suitable action, event, or period of time. The associating may occur at pre-determined intervals, periodic, randomly, once, more than once, or in response to a suitable request or action. Any of the information may be distributed and/or accessed via any suitable method, for example a software enabled link, wherein the link may be sent via an email, text, post, social network input, and/or any other method known in the art.

The process flows and screenshots depicted in the figures are merely embodiments and are not intended to limit the scope of the disclosure. For example, the steps recited in any of the method or process descriptions may be executed in any suitable order and are not limited to the order presented. It will be appreciated that the following description makes appropriate references not only to the steps and user interface elements depicted in the figures, but also to the various system components as described above with reference to FIG. 1. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below. Unless otherwise specifically noted, articles depicted in the drawings are not necessarily drawn to scale.

Computer programs (also referred to as computer control logic) may be stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

These computer program instructions may be loaded onto a general-purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

In various embodiments, software may be stored in a computer program product and loaded into a computer system using removable storage drive, hard disk drive, or communications interface. The control logic (software), when executed by the processor, causes the processor to perform the functions of various embodiments as described herein. In various embodiments, hardware components may take the form of application specific integrated circuits (ASICs). Implementation of the hardware state machine so as to perform the functions described herein will be apparent to persons skilled in the relevant art(s).

As will be appreciated by one of ordinary skill in the art, the system may be embodied as a customization of an existing system, an add-on product, a processing apparatus executing upgraded software, a stand-alone system, a distributed system, a method, a data processing system, a device for data processing, and/or a computer program product. Accordingly, any portion of the system or a module may take the form of a processing apparatus executing code, an internet-based embodiment, an entirely hardware embodiment, or an embodiment combining aspects of the internet, software, and hardware. Furthermore, the system may take the form of a computer program product on a computer-readable storage medium having computer-readable program code means embodied in the storage medium. Any suitable computer-readable storage medium may be utilized, including hard disks, solid-state storage devices, optical storage devices, magnetic storage devices, and/or the like.

In various embodiments, components, modules, and/or engines of system 100 may be implemented as micro-applications or micro-apps. Micro-apps are typically deployed in the context of a mobile operating system, including for example, Windows mobile, Android, Apple iOS, Blackberry, and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

The system and method may be described herein in terms of functional block components, screen shots, optional selections, and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language, for example such as C, C++, C #, Java, Javascript, Javascript Object Notation (JSON), VBScript, Macromedia Cold Fusion, Cobol, active server pages, Perl, assembly, PHP, awk, Python, Visual Basic, SQL Stored Procedures, PL/SQL, any Unix shell script, and/or extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as Javascript, VBScript, or the like.

The system and method are described herein with reference to screen shots, block diagrams and flowchart illustrations of methods, apparatus, and computer program products according to various embodiments. It will be understood that each functional block of the block diagrams and the flowchart illustrations, and combinations of functional blocks in the block diagrams and flowchart illustrations, respectively, can be implemented by computer program instructions.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows applications, webpages, websites, web forms, prompts, etc. Practitioners will appreciate that the illustrated steps described herein may comprise, in any number of configurations, including the use of windows applications, webpages, web forms, popup windows applications, prompts, and the like. It should be further appreciated that the multiple steps as illustrated and described may be combined into single webpages and/or windows applications but have been expanded for the sake of simplicity. In other cases, steps illustrated and described as single process steps may be separated into multiple webpages and/or applications but have been combined for simplicity.

In various embodiments, the software elements of the system may also be implemented using a Javascript run-time environment configured to execute Javascript code outside of a web browser. For example, the software elements of the system may also be implemented using Node.js components. Node.js programs may implement several modules to handle various core functionalities. For example, a package management module, such as NPM, may be implemented as an open source library to aid in organizing the installation and management of third-party Node.js programs. Node.js programs may also implement a process manager, such as, for example, Parallel Multithreaded Machine ("PM2"); a resource and performance monitoring tool, such as, for example, Node Application Metrics ("appmetrics"); a library module for building user interfaces, and/or any other suitable and/or desired module.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the internet server. Middleware may be configured to process transactions between the various components of an application server and any number of internal or external systems for any of the purposes disclosed herein. Web Sphere MQ™ (formerly MQSeries) by IBM, Inc. (Armonk, NY) is an example of a commercially available middleware product. An Enterprise Service Bus ("ESB") application is another example of middleware.

The computers discussed herein may provide a suitable website or other internet-based graphical user interface which is accessible by users. In one embodiment, Microsoft company's Internet Information Services (IIS), Transaction Server (MTS) service, and an SQL Server database, are used in conjunction with Microsoft operating systems, Windows web server software, and Microsoft Commerce Server. Additionally, components such as Access software, SQL Server database, Oracle software, Sybase software, Informix software, MySQL software, Interbase software, etc., may be used to provide an Active Data Object (ADO) compliant database management system. In one embodiment, the Apache web server is used in conjunction with a Linux operating system, a MySQL database, and Perl, PHP, Ruby, and/or Python programming languages.

For the sake of brevity, conventional data networking, application development, and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., Windows, Linux, Unix, Solaris, MacOS, etc.) as well as various conventional support software and drivers typically associated with computers.

The present system or any part(s) or function(s) thereof may be implemented using hardware, software, or a combination thereof and may be implemented in one or more computer systems or other processing systems. However, the manipulations performed by embodiments may be referred to in terms, such as matching or selecting, which are commonly associated with mental operations performed by a human operator. No such capability of a human operator is necessary, or desirable, in most cases, in any of the operations described herein. Rather, the operations may be machine operations or any of the operations may be conducted or enhanced by artificial intelligence (AI) or machine learning. AI may refer generally to the study of agents (e.g., machines, computer-based systems, etc.) that perceive the world around them, form plans, and make decisions to achieve their goals. Foundations of AI include mathematics, logic, philosophy, probability, linguistics, neuroscience, and decision theory. Many fields fall under the umbrella of AI, such as computer vision, robotics, machine learning, and natural language processing. Useful machines for performing the various embodiments include general purpose digital computers or similar devices.

In various embodiments, the embodiments are directed toward one or more computer systems capable of carrying out the functionalities described herein. The computer system includes one or more processors. The processor is connected to a communication infrastructure (e.g., a communications bus, cross-over bar, network, etc.). Various software embodiments are described in terms of this exemplary computer system. After reading this description, it will become apparent to a person skilled in the relevant art(s) how to implement various embodiments using other computer systems and/or architectures. The computer system can include a display interface that forwards graphics, text, and other data from the communication infrastructure (or from a frame buffer not shown) for display on a display unit.

The computer system also includes a main memory, such as random access memory (RAM), and may also include a secondary memory. The secondary memory may include, for example, a hard disk drive, a solid-state drive, and/or a removable storage drive. The removable storage drive reads from and/or writes to a removable storage unit in a well-known manner. As will be appreciated, the removable storage unit includes a computer usable storage medium having stored therein computer software and/or data.

In various embodiments, secondary memory may include other similar devices for allowing computer programs or other instructions to be loaded into a computer system. Such devices may include, for example, a removable storage unit and an interface. Examples of such may include a program cartridge and cartridge interface (such as that found in video game devices), a removable memory chip (such as an erasable programmable read only memory (EPROM), programmable read only memory (PROM)) and associated socket, or other removable storage units and interfaces, which allow software and data to be transferred from the removable storage unit to a computer system.

The terms "computer program medium," "computer usable medium," and "computer readable medium" are used to generally refer to media such as removable storage drive and a hard disk installed in hard disk drive. These computer program products provide software to a computer system.

The computer system may also include a communications interface. A communications interface allows software and data to be transferred between the computer system and external devices. Examples of communications interface may include a modem, a network interface (such as an Ethernet card), a communications port, etc. Software and data transferred via the communications interface are in the form of signals which may be electronic, electromagnetic, optical, or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

As used herein an "identifier" may be any suitable identifier that uniquely identifies an item. For example, the identifier may be a globally unique identifier ("GUID"). The GUID may be an identifier created and/or implemented under the universally unique identifier standard. Moreover, the GUID may be stored as 128-bit value that can be displayed as 32 hexadecimal digits. The identifier may also include a major number, and a minor number. The major number and minor number may each be 16-bit integers.

In various embodiments, the server may include application servers (e.g., Websphere, Weblogic, jBoss, Postgres Plus Advanced Server, etc.). In various embodiments, the server may include web servers (e.g., Apache, IIS, Google Web Server, and/or the like).

A web client includes any device or software which communicates via any network, such as, for example any device or software discussed herein. The web client may include internet browsing software installed within a computing unit or system to conduct online transactions and/or communications. These computing units or systems may take the form of a computer or set of computers, although other types of computing units or systems may be used, including personal computers, laptops, notebooks, tablets, smart phones, cellular phones, personal digital assistants, servers, pooled servers, mainframe computers, distributed computing clusters, kiosks, terminals, point of sale (POS) devices or terminals, televisions, or any other device capable of receiving data over a network. The web client may include an operating system as well as various conventional support software and drivers typically associated with computers. The web-client may also run Microsoft Edge, Internet Explorer, Mozilla Firefox, Google Chrome, Apple Safari, or any other of the myriad software packages available for browsing the internet.

As those skilled in the art will appreciate, the web client may or may not be in direct contact with the server (e.g., application server, web server, etc., as discussed herein). For example, the web client may access the services of the server through another server and/or hardware component, which may have a direct or indirect connection to an internet server. For example, the web client may communicate with the server via a load balancer. In various embodiments, web client access is through a network or the internet through a commercially-available web-browser software package. In that regard, the web client may be in a home or business environment with access to the network or the internet. The web client may implement security protocols such as Secure Sockets Layer (SSL) and Transport Layer Security (TLS). A web client may implement several application layer protocols including HTTP, HTTPS, FTP, and SFTP.

The various system components may be independently, separately, or collectively suitably coupled to the network via data links which includes, for example, a connection to an Internet Service Provider (ISP) over the local loop as is typically used in connection with standard modem communication, cable modem, ISDN, Digital Subscriber Line (DSL), or various wireless communication methods. It is noted that the network may be implemented as other types of networks, such as an interactive television (ITV) network. Moreover, the system contemplates the use, sale, or distribution of any goods, services, or information over any network having similar functionality described herein.

The system contemplates uses in association with web services, utility computing, pervasive and individualized computing, security and identity solutions, autonomic computing, cloud computing, commodity computing, mobility and wireless solutions, open source, biometrics, grid computing, and/or mesh computing.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, Javascript programs, active server pages (ASP), common gateway interface scripts (CGI), extensible markup language (XML), dynamic HTML, cascading style sheets (CSS), AJAX (Asynchronous JAVASCRIPT And XML) programs, helper applications, plug-ins, and the like. A server may include a web service that receives a request from a web server, the request including a URL and an IP address (e.g., 192.168.1.1). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. For example, representational state transfer (REST), or RESTful, web services may provide one way of enabling interoperability between applications.

The computing unit of the web client may be further equipped with an internet browser connected to the internet or an intranet using standard dial-up, cable, DSL, or any other internet protocol known in the art. Transactions originating at a web client may pass through a firewall in order to prevent unauthorized access from users of other networks. Further, additional firewalls may be deployed between the varying components of CMS to further enhance security Encryption may be performed by way of any of the techniques now available in the art or which may become available—e.g., Twofish, RSA, El Gamal, Schorr signature, DSA, PGP, PKI, GPG (GnuPG), HPE Format-Preserving Encryption (FPE), Voltage, Triple DES, Blowfish, AES, MD5, HMAC, IDEA, RC6, and symmetric and asymmetric cryptosystems. The systems and methods may also incorporate SHA series cryptographic methods, elliptic curve cryptography (e.g., ECC, ECDH, ECDSA, etc.), and/or other post-quantum cryptography algorithms under development.

The firewall may include any hardware and/or software suitably configured to protect CMS components and/or enterprise computing resources from users of other networks. Further, a firewall may be configured to limit or restrict access to various systems and components behind the firewall for web clients connecting through a web server. Firewall may reside in varying configurations including Stateful Inspection, Proxy based, access control lists, and Packet Filtering among others. Firewall may be integrated within a web server or any other CMS components or may further reside as a separate entity. A firewall may implement network address translation ("NAT") and/or network address port translation ("NAPT"). A firewall may accommodate various tunneling protocols to facilitate secure communications, such as those used in virtual private networking. A firewall may implement a demilitarized zone ("DMZ") to facilitate communications with a public network such as the internet. A firewall may be integrated as software within an internet server or any other application server components, reside within another computing device, or take the form of a stand-alone hardware component.

Any databases discussed herein may include relational, hierarchical, graphical, blockchain, object-oriented structure, and/or any other database configurations. Any database may also include a flat file structure wherein data may be stored in a single file in the form of rows and columns, with no structure for indexing and no structural relationships between records. For example, a flat file structure may include a delimited text file, a CSV (comma-separated values) file, and/or any other suitable flat file structure. Common database products that may be used to implement the databases include DB2 by IBM (Armonk, NY), various database products available from Oracle Corporation (Redwood Shores, CA), Microsoft Access or SQ1 Server by Microsoft Corporation (Redmond, Washington), MySQL by MySQL AB (Uppsala, Sweden), MongoDB, Redis, Apache Cassandra, hBase by Apache, MapR-DB by the MAPR corporation, or any other suitable database product. Moreover, any database may be organized in any suitable manner, for example, as data tables or lookup tables. Each record may be a single file, a series of files, a linked series of data fields, or any other data structure.

As used herein, big data may refer to partially or fully structured, semi-structured, or unstructured data sets including millions of rows and hundreds of thousands of columns. A big data set may be compiled, for example, from a history of transactions over time, from web registrations, from social media, from records of charge (ROC), from summaries of charges (SOC), from internal data, or from other suitable sources. Big data sets may be compiled without descriptive metadata such as column types, counts, percentiles, or other interpretive-aid data points.

Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); data stored as Binary Large Object (BLOB); data stored as ungrouped data elements encoded using ISO/IEC 7816-6 data elements; data stored as ungrouped data elements encoded using ISO/IEC Abstract Syntax Notation (ASN.1) as in ISO/IEC 8824 and 8825; other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored in association with the system or external to but affiliated with system. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data, in the database or associated with the system, by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, instrument, contract details, issuer, buyer, seller, user, or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

One skilled in the art will also appreciate that, for security reasons, any databases, systems, devices, servers, or other components of the system may consist of any combination thereof at a single location or at multiple locations, wherein each database or system includes any of various suitable security features, such as firewalls, access codes, encryption, decryption, compression, decompression, and/or the like.

Practitioners will also appreciate that there are a number of methods for displaying data within a browser-based document. Data may be represented as standard text or within a fixed list, scrollable list, drop-down list, editable text field, fixed text field, pop-up window, and the like.

Likewise, there are a number of methods available for modifying data in a web page such as, for example, free text entry using a keyboard, selection of menu items, check boxes, option boxes, and the like.

As used herein, the term "network" includes any cloud, cloud computing system, or electronic communications system or method which incorporates hardware and/or software components. Communication among the parties may be accomplished through any suitable communication channels, such as, for example, a telephone network, an extranet, an intranet, internet, point of interaction device (point of sale device, personal digital assistant, smartphone, kiosk, etc.), online communications, satellite communications, off-line communications, wireless communications, transponder communications, local area network (LAN), wide area network (WAN), virtual private network (VPN), networked or linked devices, keyboard, mouse, and/or any suitable communication or data input modality. Moreover, although the system is frequently described herein as being implemented with TCP/IP communications protocols, the system may also be implemented using IPX, AppleTalk, IP-6, NetBIOS, OSI, any tunneling protocol (e.g. IPsec, SSH, etc.), or any number of existing or future protocols. If the network is in the nature of a public network, such as the internet, it may be advantageous to presume the network to be insecure and open to eavesdroppers. Specific information related to the protocols, standards, and application software utilized in connection with the internet is generally known to those skilled in the art and, as such, need not be detailed herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand.

As used herein, "transmit" may include sending electronic data from one system component to another over a network connection. Additionally, as used herein, "data" may include encompassing information such as commands, queries, files, data for storage, and the like in digital or any other form.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in *In re Nuijten* to fall outside the scope of patentable subject matter under 35 U.S.C. § 101.

The disclosure and claims do not describe only a particular outcome of mobile gift card marketplaces, but the disclosure and claims include specific rules for implementing the outcome of the mobile gift card marketplace that render information into a specific format that is then used and applied to create the desired results of the mobile gift card marketplace, as set forth in *McRO, Inc. v. Bandai Namco Games America Inc.* (Fed. Cir. case number 15-1080, Sep. 13, 2016). In other words, the outcome of the mobile gift card marketplace can be performed by many different types of rules and combinations of rules, and this disclosure includes various embodiments with specific rules. While the absence of complete preemption may not guarantee that a claim is eligible, the disclosure does not sufficiently preempt the field of mobile gift card marketplaces at all. The disclosure acts to narrow, confine, and otherwise tie down the disclosure so as not to cover the general abstract idea of just a mobile gift card marketplace. Significantly, other systems and methods exist for mobile gift card marketplaces, so it would be inappropriate to assert that the claimed invention preempts the field or monopolizes the basic tools of mobile gift card marketplaces. In other words, the disclosure will not prevent others from providing mobile gift card marketplaces, because other systems are already performing the functionality in different ways than the claimed invention. Moreover, the claimed invention includes an inventive concept that may be found in the non-conventional and non-generic arrangement of known, conventional pieces, in conformance with *Bascom v. AT&T Mobility*, 2015-1763 (Fed. Cir. 2016). The disclosure and claims go way beyond any conventionality of any one of the systems in that the interaction and synergy of the systems leads to additional functionality that is not provided by any one of the systems operating independently. The disclosure and claims may also include the interaction between multiple different systems, so the disclosure cannot be considered an implementation of a generic computer, or to just "apply it" to an abstract process. The disclosure and claims may also be directed to improvements to software with a specific implementation of a solution to a problem in the software arts.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. § 112(f) unless the element is expressly recited using the phrase "means for" or "step for". As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method, comprising:

initiating, by a computer based system, a payment at a merchant;

receiving, by the computer based system, an authorization message based on the payment, wherein the authorization message comprises a currency type and at least four of a transaction number, a timestamp, a Pseudo-Primary Account Number (PPAN), an amount, a transaction code, a transaction type, a description, an acquirer ID, a merchant ID, a merchant name, a terminal ID, and a reference number;

logging, by the computer based system, the authorization message into a database along with a plurality of authorization messages;

tuning, by the computer based system, the database to optimize performance of the database, wherein the tuning includes placing frequently used files on separate file systems to reduce in and out bottlenecks;

designating, by the computer based system, the authorization message as a key field in a plurality of related data tables in the database, to speed searching for the authorization message among the plurality of authorization messages, wherein the key field partitions the database according to the high-level class of objects defined by the key field of a plurality of key fields;

merging, by the computer based system, the plurality of related data tables based on the types of the plurality of authorization messages in the plurality of key fields;

sorting, by the computer based system and in the merged plurality of related data tables, the plurality of authorization messages, according to a known order to simplify a lookup process;

obtaining, by the computer based system, the plurality of authorization messages from the merged plurality of related data tables in the database;

checking, by the computer based system, whether the currency type is an approved currency type;

rejecting, by the computer based system, a transaction in response to determining the currency type is not the approved currency type;

executing, by the computer based system, an authorization process to determine an authorized transaction, in response to receiving the authorization message from the plurality of authorization messages;

validating, by the computer based system, the authorized transaction to determine whether the authorized transaction is associated with a customer;

executing, by the computer based system, a merchant validation process to determine if the authorized transaction is associated with the merchant;

determining, by the computer based system, an available gift card account balance of the customer associated with the merchant in response to determining the authorized transaction is associated with both the customer and the merchant;

executing, by the computer based system, a gift card redemption process to redeem the available gift card account balance of the customer associated with the merchant, wherein the executing the gift card redemption process comprises:

recalling, by the computer based system, based on at least one of the merchant ID or the merchant name a plurality of gift cards associated with a customer record from a database of gift cards;

ordering, by the computer based system, the plurality of gift cards associated with the customer record in reverse chronological order; and redeeming, by the computer based system, the plurality of gift cards in the reverse chronological order for at least a portion of the amount of the authorization message;

paying, by the computer based system using a digital wallet payment process, any remaining balance of a transaction amount unable to be paid from the redeeming the plurality of gift cards; and applying, by the computer based system using a loyalty cashback process, a credit, based on the transaction amount, to a digital wallet balance associated with the customer.

2. The method of claim 1, further comprising:

performing, by the computer based system, a key field search based on the PPAN from the authorization message of a database comprising customer data associated with a plurality of PPANs;

returning, by the computer based system, a customer record associated with the PPAN;

determining, by the computer based system, an active customer based on the customer record associated with the PPAN; and rejecting, by the computer based system, a transaction in response to not determining the active customer or not returning the customer record.

3. The method of claim 1, further comprising:

performing, by the computer based system, a key field search based on the merchant ID from the authorization message of a database comprising merchant data associated with a plurality of merchant IDs and a plurality of merchant names;

performing, by the computer based system, the key field search based on the merchant name from the authorization message of the database comprising merchant data associated with the plurality of merchant IDs and the plurality of merchant names;

returning, by the computer based system, a record associated with at least one of the merchant ID or the merchant name from the authorization message; and proceeding, by the computer based system, to a balance check and redemption process in response to returning the record associated with at least one of the merchant ID or the merchant name from the authorization message.

4. The method of claim 1, further comprising:

determining, by the computer based system, a remaining amount to charge after redeeming the plurality of gift cards;

debiting, by the computer based system, the digital wallet balance associated with the customer by the remaining amount; and transmitting, by the computer based system, an approved authorization message.

5. A system comprising:

one or more processors; and one or more tangible, non-transitory memories configured to communicate with the one or more processors, the one or more tangible, non-transitory memories having instructions stored thereon that, in response to execution by the one or more processors, cause the one or more processors to perform operations comprising:

initiating, by the one or more processors, a payment at a merchant;

receiving, by the one or more processors, an authorization message based on the payment, wherein the authorization message comprises a currency type and at least four of a transaction number, a timestamp, a Pseudo-Primary Account Number (PPAN), an amount, a transaction code, a transaction type, a description, an acquirer ID, a merchant ID, a merchant name, a terminal ID, and a reference number;

logging, by the one or more processors, the authorization message into a database along with a plurality of authorization messages;

tuning, by the one or more processors, the database to optimize performance of the database, wherein the tuning includes placing frequently used files on separate file systems to reduce in and out bottlenecks;

designating, by the one or more processors, the authorization message as a key field in a plurality of related data tables in the database, to speed searching for the authorization message among the plurality of authorization messages, wherein the key field partitions the database according to the high-level class of objects defined by the key field of a plurality of key fields;

merging, by the one or more processors, the plurality of related data tables based on the types of the plurality of authorization messages in the plurality of key fields;

sorting, by the one or more processors and in the merged plurality of related data tables, the plurality of authorization messages, according to a known order to simplify a lookup process;

obtaining, by the one or more processors, the plurality of authorization messages from the merged plurality of related data tables in the database;

checking, by the one or more processors, whether the currency type is an approved currency type;

rejecting, by the one or more processors, a transaction in response to determining the currency type is not the approved currency type;

executing, by the one or more processors, an authorization process to determine an authorized transaction, in response to receiving the authorization message from the plurality of authorization messages;

validating, by the one or more processors, the authorized transaction to determine whether the authorized transaction is associated with a customer;

executing, by the one or more processors, a merchant validation process to determine if the authorized transaction is associated with the merchant;

determining, by the one or more processors, an available gift card account balance of the customer associated with the merchant in response to determining the authorized transaction is associated with both the customer and the merchant;

executing, by the one or more processors, a gift card redemption process to redeem the available gift card account balance of the customer associated with the merchant, wherein the executing the gift card redemption process comprises:

recalling, by the one or more processors, based on at least one of the merchant ID or the merchant name a plurality of gift cards associated with a customer record from a database of gift cards;

ordering, by the one or more processors, the plurality of gift cards associated with the customer record in reverse chronological order; and redeeming, by the one or more processors, the plurality of gift cards in the reverse chronological order for at least a portion of the amount of the authorization message;

paying, by the one or more processors using a digital wallet payment process, any remaining balance of a transaction amount unable to be paid from the redeeming the plurality of gift cards; and applying, by the one or more processors using a loyalty cashback process, a credit, based on the transaction amount, to a digital wallet balance associated with the customer.

6. The system of claim 5, wherein the operations further comprise:

performing, by the one or more processors, a key field search based on the PPAN from the authorization message of a database comprising customer data associated with a plurality of PPANs;

returning, by the one or more processors, a customer record associated with the PPAN;

determining, by the one or more processors, an active customer based on the customer record associated with the PPAN; and rejecting, by the one or more processors, a transaction in response to not determining the active customer or not returning the customer record.

7. The system of claim 5, wherein the operations further comprise:

performing, by the one or more processors, a key field search based on the merchant ID from the authorization message of a database comprising merchant data associated with a plurality of merchant IDs and a plurality of merchant names;

performing, by the one or more processors, the key field search based on the merchant name from the authorization message of the database comprising merchant data associated with the plurality of merchant IDs and the plurality of merchant names;

returning, by the one or more processors, a record associated with at least one of the merchant ID or the merchant name from the authorization message; and proceeding, by the one or more processors, to a balance check and redemption process in response to returning the record associated with at least one of the merchant ID or the merchant name from the authorization message.

8. The system of claim 5, wherein the authorization message further comprises a product ID and wherein the operations further comprise:

performing, by the one or more processors, a key field search based on the product ID from the authorization message of a database comprising product data associated with a plurality of product IDs;

returning, by the one or more processors, a record associated with the product ID from the authorization message; and proceeding, by the one or more processors, to a balance check and redemption process in response to returning the record associated with the product ID from the authorization message.

9. The system of claim 5, wherein the authorization message further comprises a product ID and wherein the operations further comprise:
   performing, by the one or more processors, a key field search based on the product ID and at least of the merchant ID or the merchant name from the authorization message of a database comprising product data associated with a plurality of product IDs and merchant data associated with a plurality of merchant IDs and a plurality of merchant names;
   returning, by the one or more processors, a record associated with the product ID at least one of the merchant ID or the merchant name from the authorization message; and
   proceeding, by the one or more processors, toa balance check and redemption process in response to returning the record associated with the product ID and the at least one of the merchant ID and the merchant name, the record indicating that the product ID is restricted to the merchant ID.

10. An article of manufacture including a non-transitory, tangible computer readable storage medium having instructions stored thereon that, in response to execution by a computer based system, cause the computer based system to perform operations comprising:
   initiating, by the computer based system, a payment at a merchant;
   receiving, by the computer based system, an authorization message based on the payment,
   wherein the authorization message comprises a currency type and at least four of a transaction number, a timestamp, a Pseudo-Primary Account Number (PPAN), an amount, a transaction code, a transaction type, a description, an acquirer ID, a merchant ID, a merchant name, a terminal ID, and a reference number;
   logging, by the computer based system, the authorization message into a database along with a plurality of authorization messages;
   tuning, by the computer based system, the database to optimize performance of the database,
   wherein the tuning includes placing frequently used files on separate file systems to reduce in and out bottlenecks;
   designating, bythe computer based system, the authorization message as a key field in a plurality of related data tables in the database, tospeed searching for the authorization message among the plurality of authorization messages,
   wherein the key field partitions the database according to the high-level class of objects defined by the key field of a plurality of key fields;
   merging, by the computer based system, the plurality of related data tables based on the types of the plurality of authorization messages in the plurality of key fields;
   sorting, by the computer based system and in the merged plurality of related data tables, the plurality of authorization messages, according to a known order to simplify a lookup process;
   obtaining, by the computer based system, the plurality of authorization messages from the merged plurality of related data tables in the database;
   checking, by the computer based system, whether the currency type is an approved currency type;
   rejecting, by the computer based system, a transaction in response to determining the currency type is not the approved currency type;
   executing, by the computer based system, an authorization process to determine an authorized transaction, in response to receiving the authorization message from the plurality of authorization messages;
   validating, by the computer based system, the authorized transaction to determine whether the authorized transaction is associated with a customer;
   executing, by the computer based system, a merchant validation process to determine if the authorized transaction is associated with the merchant;
   determining, by the computer based system, an available gift card account balance of the customer associated with the merchant in response to determining the authorized transaction is associated with both the customer and the merchant;
   executing, by the computer based system, a gift card redemption process to redeem the available gift card account balance of the customer associated with the merchant,
   wherein the executing the gift card redemption process comprises:
      recalling, by the computer based system, based on at least one of the merchant ID or the merchant name a plurality of gift cards associated with a customer record from a database of gift cards;
      ordering, by the computer based system, the plurality of gift cards associated with the customer record in reverse chronological order; and
      redeeming, by the computer based system, the plurality of gift cards in the reverse chronological order for at least a portion of the amount of the authorization message;
   paying, by the computer based system using a digital wallet payment process, any remaining balance of a transaction amount unable to be paid from the redeeming the plurality of gift cards; and
   applying, by the computer based system using a loyalty cashback process, a credit, based on the transaction amount, to a digital wallet balance associated with the customer.

11. The article of manufacture of claim 10, wherein the operations further comprise:
   performing, by the computer based system, a key field search based on the PPAN from the authorization message of a database comprising customer data associated with a plurality of PPANs;
   returning, by the computer based system, a customer record associated with the PPAN;
   determining, by the computer based system, an active customer based on the customer record associated with the PPAN; and
   rejecting, by the computer based system, a transaction in response to not determining the active customer or not returning the customer record.

12. The article of manufacture of claim 10, wherein the operations further comprise:
   performing, by the computer based system, a key field search based on the merchant ID from the authorization message of a database comprising merchant data associated with a plurality of merchant IDs and a plurality of merchant names;
   performing, by the computer based system, the key field search based on the merchant name from the authorization message of the database comprising merchant data associated with the plurality of merchant IDs and the plurality of merchant names;

returning, by the computer based system, a record associated with at least one of the merchant ID or the merchant name from the authorization message; and proceeding, by the computer based system, to a balance check and redemption process in response to returning the record associated with at least one of the merchant ID or the merchant name from the authorization message.

13. The article of manufacture of claim 10, wherein the operations further comprise transmitting, by the computer based system, an approved authorization message.

* * * * *